US011803490B2

(12) United States Patent
Sun et al.

(10) Patent No.: US 11,803,490 B2
(45) Date of Patent: Oct. 31, 2023

(54) APPARATUS AND METHOD FOR DATA TRANSMISSION AND READABLE STORAGE MEDIUM

(71) Applicant: Wuxi Hisky Medical Technologies Co., Ltd., Wuxi (CN)

(72) Inventors: Shibo Sun, Wuxi (CN); Qiong He, Wuxi (CN); Jinhua Shao, Wuxi (CN); Jin Sun, Wuxi (CN); Houli Duan, Wuxi (CN)

(73) Assignee: WUXI HISKY MEDICAL TECHNOLOGIES CO., LTD., Wuxi (CN)

( * ) Notice: Subject to any disclaimer, the term of this patent is extended or adjusted under 35 U.S.C. 154(b) by 116 days.

(21) Appl. No.: 17/485,191

(22) Filed: Sep. 24, 2021

(65) Prior Publication Data

US 2022/0012194 A1    Jan. 13, 2022

Related U.S. Application Data

(63) Continuation of application No. PCT/CN2020/071106, filed on Jan. 9, 2020.

(30) Foreign Application Priority Data

Mar. 27, 2019  (CN) .......................... 201910237373.3

(51) Int. Cl.
*G06F 13/16* (2006.01)
*G06F 13/28* (2006.01)
(52) U.S. Cl.
CPC .......... *G06F 13/1673* (2013.01); *G06F 13/28* (2013.01)
(58) Field of Classification Search
CPC .............................. G06F 13/1673; G06F 13/28
See application file for complete search history.

(56) References Cited

U.S. PATENT DOCUMENTS 8,234,478 B1     7/2012 Roberts
10,120,586 B1 *  11/2018 Bruce .................... G06F 13/28
(Continued)

FOREIGN PATENT DOCUMENTS

CN      101004727 A      7/2007
CN      101556564 A     10/2009
(Continued)

OTHER PUBLICATIONS

Extended European Search Report of the parallel application of EP20777660.0.
(Continued)

*Primary Examiner* — Idriss N Alrobaye
*Assistant Examiner* — Ronald T Modo
(74) *Attorney, Agent, or Firm* — J.C. PATENTS

(57) ABSTRACT

The present application provides an apparatus, a method for data transmission and a readable storage medium, the apparatus includes a front-end processor, a transmission controller and a back-end processor. In the front-end processor, a DMA controller is respectively connected with the transmission controller, a memory controller, respective transmission buffers and a transmission scheduler. The DMA controller is configured to: receive a request for data transmission sent by the back-end processor, receive read data from the memory controller, and send it to the transmission buffers. The memory controller is configured to: control, according to a data reading instruction, the memory to read data, and send the read data to the DMA controller. The transmission scheduler is configured to: control multiple transmission buffers to write data sent by the DMA controller, and control the multiple transmission buffers to read data, and transmit, through the transmission controller, the data to the back-end processor.

24 Claims, 7 Drawing Sheets

(56) References Cited

U.S. PATENT DOCUMENTS

| | | | |
|---|---|---|---|
| 2009/0037653 | A1 | 2/2009 | Brokenshire |
| 2018/0150242 | A1 | 5/2018 | Yi |
| 2018/0239705 | A1 | 8/2018 | Heirman |

FOREIGN PATENT DOCUMENTS

| | | | | |
|---|---|---|---|---|
| CN | 101777031 | A | | 7/2010 |
| CN | 102546098 | A | | 7/2012 |
| CN | 203773954 | U | | 8/2014 |
| CN | 105138470 | A | | 12/2015 |
| CN | 105335306 | A | | 2/2016 |
| CN | 108121674 | A | | 6/2018 |
| CN | 108228498 | A | | 6/2018 |
| CN | 108369511 | A | | 8/2018 |
| CN | 110008156 | A | | 7/2019 |
| JP | H0668022 | A | | 3/1994 |
| JP | H0798684 | A | | 4/1995 |
| JP | H11327874 | A | | 11/1999 |
| JP | 2003345774 | A | | 12/2003 |
| JP | 2006099358 | A | | 4/2006 |
| JP | 2009147786 | A | * | 7/2009 ............ H04L 69/16 |
| RU | 2589398 | C2 | | 7/2016 |
| RU | 2705421 | C1 | | 11/2019 |
| WO | WO2017105713 | A1 | | 6/2017 |

OTHER PUBLICATIONS

First Office Action of the parallel application JP2021-557437.
First Office Action of the parallel application RU2021129519.
International Search Report for PCT/CN2020/071106.
First Office Action of the priority CN application No. 201910237373.
3.
"MPC8245 Integrated Processor Reference Manual", No. Rev. 3. Jun. 30, 2005, chapter 1, pp. 3-13, and chapter 8, pp. 1-24.

* cited by examiner

The mapping unit receives a request for single frame data transmission sent by the back-end processor, where the request for single frame data transmission includes frame start address and frame length information; and sends, according to the request for single frame data transmission, a data reading instruction to the memory controller ~ S1001

The memory controller controls, according to the data reading instruction, a memory to read data; and sends the read data to the DMA controller ~ S1002

The DMA controller controls the data to be transmitted in a single frame manner ~ S1003

The transmission scheduler controls a plurality of transmission buffers to write data sent by the DMA controller, and controls the plurality of the transmission buffers to read data and transmits, through the transmission controller, the data to the back-end processor ~ S1004

FIG. 10

APPARATUS AND METHOD FOR DATA TRANSMISSION AND READABLE STORAGE MEDIUM

CROSS-REFERENCE TO RELATED APPLICATIONS

This application is a continuation of International Application No. PCT/CN 2020/071106, filed on Jan. 9, 2020, which claims priority to Chinese Patent Application No. 201910237373.3, filed on Mar. 27, 2019. The disclosures of the aforementioned applications are hereby incorporated by reference in their entireties.

TECHNICAL FIELD

Embodiments of the present application relate to the technical field of big data processing, in particular to an apparatus, a method for data transmission and a readable storage medium.

BACKGROUND

With the development of the Internet and the progress of science and technology, there has been an explosive growth of data in various science and technology industries, which forms a large amount of data. For example, in the technical field of ultra-high-speed ultrasound imaging, the ultra-high-speed ultrasound imaging system generates a large amount of data, the data is cached in a front-end memory of the system and needs to be transmitted to a back-end memory or external memory as soon as possible for subsequent processing. This requires the transmission of big data.

In the prior art, the transmission of big data not only increases the burden of the back-end processor of a data processing system and consumes a large amount of resources, but also leads to the slow process of transmission of big data due to the problems of a transmission mechanism, and the fast transmission of big data cannot be carried out.

SUMMARY

Embodiments of the present application provide an apparatus, a method for data transmission and a readable storage medium, which solve the technical problems that in the transmission of big data, the burden of a back-end processor of a data processing system is increased, a large amount of resources are consumed, and the process of transmission of large data is slow due to the problems of a transmission mechanism in the prior art.

In a first aspect, an embodiment of the present application provides an apparatus for data transmission, including: a front-end processor, a transmission controller and a back-end processor;

where the front-end processor is connected, through the transmission controller, with the back-end processor;

the front-end processor includes: a direct memory access (DMA) controller, a transmission scheduler, a memory controller and a plurality of transmission buffers; where the DMA controller is respectively connected with the transmission controller, the memory controller, respective transmission buffers and the transmission scheduler, the transmission controller and the transmission scheduler are respectively connected with the respective transmission buffers;

the DMA controller is configured to: receive a request for data transmission sent by the back-end processor; send, according to the request for data transmission, a data reading instruction to the memory controller; and receive read data and send the read data to the transmission buffers;

the memory controller is configured to: control, according to the data reading instruction, a memory to read data; and send the read data to the DMA controller;

the transmission scheduler is configured to: control the plurality of the transmission buffers to write data sent by the DMA controller, and control the plurality of the transmission buffers to read data and transmit, through the transmission controller, the data to the back-end processor.

Further, in the apparatus as described above, the DMA controller is specifically configured to control the data to be transmitted in a single frame manner or a multiple frame manner.

Further, in the apparatus as described above, the DMA controller includes: a mapping unit, a segment counter and an intra-segment addresser;

the mapping unit is respectively connected with the segment counter and the intra-segment addresser, and the segment counter is connected with the intra-segment addresser;

the mapping unit is configured to: receive a request for single frame data transmission sent by the back-end processor, where the request for single frame data transmission includes frame start address and frame length information; and map the frame start address and the frame length information into intra-segment addressing information and segment counting information;

the intra-segment addresser is configured to: update, according to the data sent by the DMA controller, the intra-segment addressing information; send, if the intra-segment addressing in the intra-segment addressing information reaches a maximum value, segment count updating information to the segment counter; and set the intra-segment addressing in the intra-segment addressing information as an initial value of the intra-segment addressing to perform the intra-segment addressing of a next segment;

the segment counter is configured to perform, if the segment count updating information is received, subtraction counting until a count in the segment counting information is an initial value of the segment counting.

Further, in the apparatus as described above, the intra-segment addresser is specifically configured to: set the intra-segment addressing in the intra-segment addressing information as zero to perform the intra-segment addressing of the next segment;

the segment counter is configured to perform, if the segment count updating information is received, counting by subtracting one until the count in the segment counting information is zero.

Further, in the apparatus as described above, the DMA controller includes: a mapping unit, an intra-segment addresser, a segment counter and a frame counter;

the mapping unit is respectively connected with the frame counter, the segment counter and the intra-segment addresser, and the segment counter is respectively connected with the intra-segment addresser and the frame counter;

the mapping unit is configured to: receive a request for multiple frame data transmission sent by the back-end processor, where the request for multiple frame data transmission includes a number of frames, frame start address and frame length information; and map the number of frames, the frame start address and the frame length information into intra-segment addressing information, segment counting information and frame counting information;

the intra-segment addresser is configured to: update, according to the data sent by the DMA controller, the intra-segment addressing information; send, if the intra-segment addressing in the intra-segment addressing information reaches a maximum value, segment count updating information to the segment counter; and set the intra-segment addressing in the intra-segment addressing information as an initial value of the intra-segment addressing to perform the intra-segment addressing of a next segment;

the segment counter is configured to: perform, if the segment count updating information is received, subtraction counting; and sending, if a count in the segment counting information is an initial value of the segment counting, frame count updating information to the frame counter; and set the count in the segment counting information as the maximum value to perform the segment counting of the next frame;

the frame counter is configured to perform, if the frame count updating information is received, subtraction counting until a count in the frame counting information is an initial value of the frame counting.

Further, in the apparatus as described above, the intra-segment addresser is specifically configured to: set the intra-segment addressing in the intra-segment addressing information as zero to perform the intra-segment addressing of the next segment;

the segment counter is specifically configured to: perform, if the segment count updating information is received, counting by subtracting one; and send, if the count in the segment counting information is zero, frame count updating information to the frame counter;

the frame counter is specifically configured to perform, if the frame count updating information is received, counting by subtracting one until the count in the frame counting information is zero.

Further, in the apparatus as described above, the transmission scheduler includes an entry scheduler and an exit scheduler;

the entry scheduler is configured to control, according to an entry scheduling state and writing token information, a transmission buffer with writing authority to write data;

the exit scheduler is configured to control, according to an exit scheduling state and reading token information, a transmission buffer with reading authority to read data.

Further, in the apparatus as described above, the entry scheduling state includes: an idle state and a plurality of transmission buffer writing states;

the entry scheduler is specifically configured to: control, if the entry scheduling state is the idle state and the writing token information is certain writing token information, the idle state to jump to a transmission buffer writing state corresponding to the certain writing token information; and control a transmission buffer corresponding to the transmission buffer writing state to write data.

Further, in the apparatus as described above, the entry scheduler is further configured to: update, if written data of a current transmission buffer reaches a first preset length value, a current transmission buffer writing state to the idle state; and update current writing token information to another writing token information.

Further, in the apparatus as described above, the entry scheduler is specifically configured to: determine, according to waiting time for writing of each transmission buffer, a transmission buffer with longest waiting time for writing; and update the current writing token information to writing token information of the transmission buffer with the longest waiting time for writing.

Further, in the apparatus as described above, the exit scheduling state includes a transmission controller detection state, a transmission buffer detection state, and a plurality of transmission buffer reading states;

the exit scheduler is specifically configured to: if the exit scheduling state is the transmission controller detection state and the reading token information is certain reading token information, control the transmission controller detection state to jump to the transmission buffer detection state after the transmission controller passing a detection, control the transmission buffer detection state to jump to a transmission buffer reading state corresponding to the certain reading token information after the transmission buffer passing a detection, and control a transmission buffer corresponding to the transmission buffer reading state to read data.

Further, in the apparatus as described above, the exit scheduler is further configured to: update, if read data of a current transmission controller reaches a second preset length value, a current transmission buffer reading state to the transmission controller detection state; and update current reading token information to another reading token information.

Further, in the apparatus as described above, the exit scheduler is specifically configured to: determine, according to waiting time for reading of each transmission buffer, a transmission buffer with longest waiting time for reading; and update the current reading token information to reading token information of the transmission buffer with the longest waiting time for reading.

Further, in the apparatus as described above, the transmission controller includes: a multiple data buffer area, a transmission processor and a serial communication engine;

the transmission processor is respectively connected with the multiple data buffer area and the serial communication engine;

the multiple data buffer area is configured to cache data;

the transmission processor is configured to send data in the multiple data buffer area to the serial communication engine;

the serial communication engine is configured to receive data sent by the transmission processor and send the data to the back-end processor.

Further, in the apparatus as described above, the back-end processor includes a multi-core central processing unit (CPU);

the multi-core CPU is configured to transmit, in a parallel manner, data to a back-end memory.

In a second aspect, an embodiment of the present application provides a method for data transmission, including:

receiving, by a DMA controller, a request for data transmission sent by a back-end processor; and sending, according to the request for data transmission, a data reading instruction to a memory controller;

controlling, by the memory controller, according to the data reading instruction, a memory to read data, and sending the read data to the DMA controller;

receiving, by the DMA controller, the read data and sending the read data to the transmission buffers;

controlling, by the transmission scheduler, a plurality of transmission buffers to write data sent by the DMA controller, and controlling the plurality of the transmission buffers to read data and transmitting, through the transmission controller, the data to the back-end processor.

Further, in the method as described above, the receiving, by the DMA controller, the read data and sending the read data to the transmission buffer specifically includes:

controlling, by the DMA controller, the data to be transmitted in a single frame or multiple frame manner.

Further, in the method as described above, the DMA controller includes: a mapping unit, a segment counter and an intra-segment addresser;

receiving, by the DMA controller, the request for data transmission sent by a back-end processor specifically includes:

receiving, by the mapping unit, a request for single frame data transmission sent by the back-end processor, where the request for single frame data transmission includes frame start address and frame length information;

accordingly, the controlling, by the DMA controller, the data to be transmitted in a single frame specifically includes:

mapping, by the mapping unit, the frame start address and the frame length information into intra-segment addressing information and segment counting information;

updating, by the intra-segment addresser, according to data sent by the DMA controller, the intra-segment addressing information; sending, if the intra-segment addressing in the intra-segment addressing information reaches a maximum value, segment count updating information to the segment counter; and setting the intra-segment addressing in the intra-segment addressing information as an initial value of the intra-segment addressing to perform the intra-segment addressing of a next segment;

performing, by the segment counter, if the segment count updating information is received, subtraction counting until a count in the segment counting information is an initial value of the segment counting.

Further, in the method as described above, the setting, by the intra-segment addresser, the intra-segment addressing in the intra-segment addressing information as the initial value of the intra-segment addressing to perform the intra-segment addressing of the next segment specifically includes:

setting, by the intra-segment addresser, the intra-segment addressing in the intra-segment addressing information as zero to perform the intra-segment addressing of the next segment;

the performing, by the segment counter, if the segment count updating information is received, subtraction counting until the count in the segment counting information is the initial value of the segment counting specifically includes:

performing, by the segment counter, if the segment count updating information is received, counting by subtracting one until the count in the segment counting information is zero.

Further, in the method as described above, the DMA controller includes: a mapping unit, an intra-segment addresser, a segment counter and a frame counter;

receiving, by the DMA controller, a request for data transmission sent by the back-end processor specifically includes:

receiving, by the mapping unit, a request for multiple frame data transmission sent by the back-end processor, where the request for multiple frame data transmission includes a number of frames, frame start address and frame length information;

controlling, by the DMA controller, the data to be transmitted in a multiple frame manner specifically includes:

mapping, by the mapping unit, the number of frames, the frame start address and the frame length information into intra-segment addressing information, segment counting information and frame counting information;

the updating, by the intra-segment addresser, according to data sent by the DMA controller, the intra-segment addressing information; sending, if the intra-segment addressing in the intra-segment addressing information reaches a maximum value, segment count updating information to the segment counter; and setting the intra-segment addressing in the intra-segment addressing information as an initial value of the intra-segment addressing to perform the intra-segment addressing of a next segment;

performing, by the segment counter, if the segment count updating information is received, subtraction counting, sending, if a count in the segment counting information is an initial value of the segment counting, frame count updating information to the frame counter, and setting the count in the segment counting information as a maximum value to perform the segment counting of a next frame;

performing, by the frame counter, if the frame count updating information is received, subtraction counting until a count in the frame counting information is an initial value of the frame counting.

Further, in the method as described above, the setting, by the intra-segment addresser, the intra-segment addressing in the intra-segment addressing information as the initial value of the intra-segment addressing to perform the intra-segment addressing of the next segment specifically includes:

the setting, by the intra-segment addresser, the intra-segment addressing in the intra-segment addressing information as zero to perform the intra-segment addressing of the next segment;

the performing, by the segment counter, if the segment count updating information is received, subtraction counting, sending, if the count in the segment counting information is the initial value of the segment counting, frame count updating information to the frame counter specifically includes:

performing, by the segment counter, if the segment counter receives the segment count updating information is received, counting by subtracting one, and sending, if the count in the segment counting information is zero, frame count updating information to the frame counter;

the performing, by the frame counter, if the frame count updating information is received by the frame counter, subtraction counting until the count in the frame counting information is the initial value of the frame counting specifically includes:

performing, by the frame counter, if the frame count updating information is received by the frame counter, counting by subtracting one until the count in the frame counting information is zero.

Further, in the method as described above, the transmission scheduler includes an entry scheduler and an exit scheduler;

controlling, by the transmission scheduler, the plurality of the transmission buffers to write data sent by the DMA controller, and controlling the plurality of the transmission buffers to read data specifically includes:

controlling, by the entry scheduler, according to an entry scheduling state and writing token information, a transmission buffer with writing authority to write data;

controlling, by the exit scheduler, according to an exit scheduling state and reading token information, a transmission buffer with reading authority to read data.

Further, in the method as described above, the entry scheduling state includes: an idle state and a plurality of transmission buffer writing states;

controlling, by the entry scheduler, according to the entry scheduling state and the writing token information, the transmission buffer with the writing authority to write the data specifically includes:

controlling, if the entry scheduling state is the idle state and the writing token information is certain writing token information, the idle state to jump to a transmission buffer writing state corresponding to the certain writing token information; and controlling the transmission buffer corresponding to the transmission buffer writing state to write data.

Further, in the method as described above, after the controlling the transmission buffer to write data, the method further includes:

updating, if written data of a current transmission buffer reaches a first preset length value, a current transmission buffer writing state to the idle state; and updating current writing token information to another writing token information.

Further, in the method as described above, where the updating the current writing token information to another writing token information specifically includes:

determining, by the entry scheduler, according to waiting time for writing of each transmission buffer, a transmission buffer with longest waiting time for writing; and updating the current writing token information to writing token information of the transmission buffer with the longest waiting time for writing.

Further, in the method as described above, the exit scheduling state includes a transmission controller detection state, a transmission buffer detection state, and a plurality of transmission buffer reading states;

where the controlling, by the exit scheduler, according to the exit scheduling state and the reading token information, the transmission buffer with the reading authority to read the data specifically includes:

if the exit scheduling state is the transmission controller detection state and the reading token information is certain reading token information, controlling the transmission controller detection state to jump to the transmission buffer detection state after the transmission controller passing a detection, controlling the transmission buffer detection state to jump to a transmission buffer reading state corresponding to the certain reading token information after the transmission buffer passing a detection, and controlling a transmission buffer corresponding to the transmission buffer reading state to read data.

Further, in the method as described above, after the controlling the transmission buffer to read the data, the method further includes:

updating, if read data of a current transmission controller reaches a second preset length value, a current transmission buffer reading state to the transmission controller detection state; and updating current reading token information to another reading token information.

Further, in the method as described above, the updating the current reading token information to another reading token information specifically includes:

determining, by the exit scheduler, according to waiting time for reading of each transmission buffer, a transmission buffer with longest waiting time for reading, and updating the current reading token information to reading token information of the transmission buffer with the longest waiting time for reading.

Further, in the method as described above, the transmission controller includes a multiple data buffer area, a transmission processor and a serial communication engine;

the method further includes:

caching, by the multiple data buffer area, data;

sending, by the transmission processor, data in the multiple data buffer area to the serial communication engine;

receiving, by the serial communication engine, data sent by the transmission processor and sending the data to the back-end processor.

Further, the method as described above, the back-end processor includes a multi-core CPU;

the method further includes:

transmitting, by the multi-core CPU, in a parallel manner, data to a back-end memory.

In a third aspect, an embodiment of the present application provides a computer readable storage medium stored with a computer program, and the computer program is executed by a processor to implement the method according to any one of the second aspect.

The embodiments of the present application provide an apparatus, a method for data transmission and a readable storage medium, the apparatus includes a front-end processor, a transmission controller and a back-end processor. The front-end processor is connected, through the transmission controller, with the back-end processor. The front-end processor includes a DMA controller, a transmission scheduler, a memory controller and a plurality of transmission buffers; where the DMA controller is respectively connected with the transmission controller, the memory controller, respective transmission buffers and the transmission scheduler, the transmission controller and the transmission scheduler are respectively connected with the respective transmission buffers; the DMA controller is configured to: receive a request for data transmission sent by the back-end processor; send, according to the request for data transmission, a data reading instruction to the memory controller; and receive read data and send the read data to the transmission buffer; the memory controller is configured to: control, according to the data reading instruction, a memory to read data, and send the read data to the DMA controller; the transmission scheduler is configured to: control the plurality of the transmission buffers to write data sent by the DMA controller, and control the plurality of the transmission buffers to read data and transmit, through the transmission controller, the data to the back-end processor. Since in the front-end processor, the transmitted data can be scheduled in order, large data can be transmitted fast, and the data can be transmitted after the back-end processor is ready to receive the data, thus the burden of the back-end processor will not be increased and the consumption of a large amount of resources is avoided.

It should be understood that what is described in the summary section above is not intended to define the key or important features of embodiments of the present application, nor is it intended to limit the scope of the present application. Other features of the present application will become apparent via the following description.

BRIEF DESCRIPTION OF THE DRAWINGS

In order to explain the embodiments of the present application or the technical solution in the prior art more clearly, the accompanying drawings required in the embodiments or the description of the prior art will be briefly introduced below. Obviously, the accompanying drawings in the following description are some embodiments of the present application, and other accompanying drawings can be obtained according to these drawings without paying creative labor for the ordinary skilled of the prior art.

FIG. 10 is a flowchart of the method for data transmission provided in Embodiment 7 of the present application;

REFERENCE NUMBER

101—Front-end processor
1011—DMA controller
1011a—Mapping unit
1011b—Segment counter
1011c—Intra-segment addresser
1011d—Frame counter
1012—Transmission scheduler
1012a—Entry scheduler
1012b—Exit scheduler
1013—Memory controller
1014—First transmission buffer
1015—Second transmission buffer
1016—Memory
102—Transmission controller
102a—Multiple data buffer area
102b—Transmission processor
102c—Serial communication engine
103—Back-end processor

DESCRIPTION OF EMBODIMENTS

Embodiments of the present application will be described in more detail below with reference to the accompanying drawings. Although some embodiments of the present application are shown in the accompanying drawings, it should be understood that the present application can be implemented in various forms and should not be construed as limited to the embodiments set forth herein, but on the contrary, these embodiments are provided for a more thorough and complete understanding of the present application. It should be understood that the accompanying drawings and embodiments of the present application are for exemplary purposes only, and are not intended to limit the protection scope of the present application.

The terms "first", "second", "third", "fourth", etc. (if any) in the description, claims of the embodiments of the present application and the above accompanying drawings are used to distinguish similar objects, and are not necessarily used to describe a specific order or sequence. It should be understood that data used as thus may be interchanged under appropriate circumstances, so that the embodiments of the present application described herein can be implemented in an order other than those illustrated or described herein. In addition, the terms "including" and "having" and any variations thereof are intended to cover non-exclusive inclusion. For example, a process, method, system, product or device including a series of steps or units need not be limited to those steps or units explicitly listed, but may include other steps or units not explicitly listed or inherent to these processes, methods, products or devices.

Embodiment 1

Figure 1:
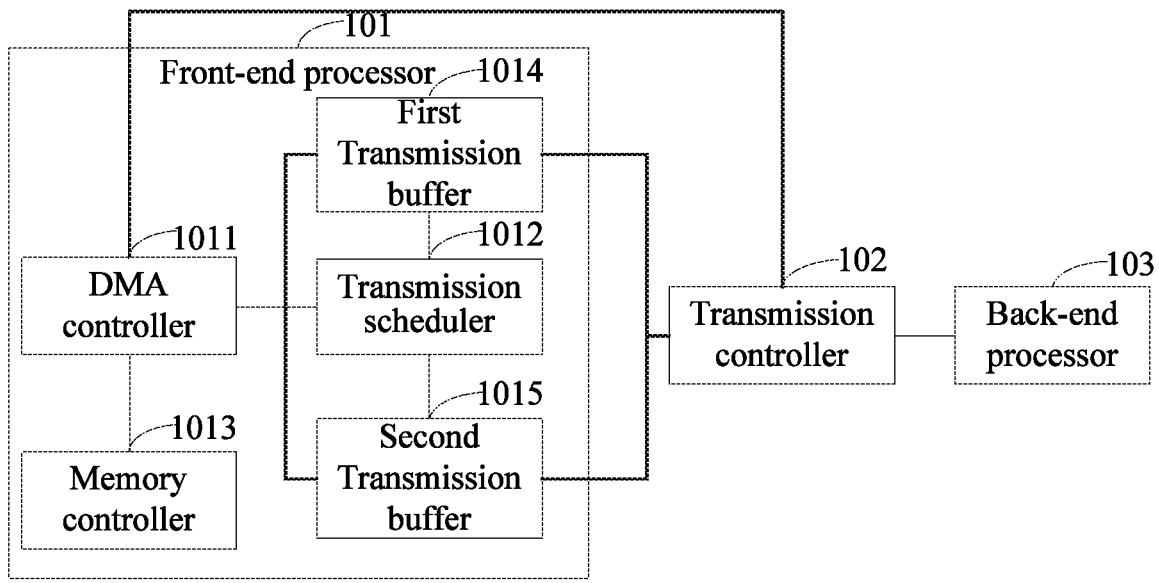
FIG. 1 is a schematic structural diagram of an apparatus for data transmission provided in Embodiment 1 of the present application.

FIG. 1 is a schematic structural diagram of an apparatus for data transmission provided in Embodiment 1 of the present application; as shown in FIG. 1, the apparatus for data transmission provided in this embodiment includes a front-end processor 101, a transmission controller 102 and a back-end processor 103.

The front-end processor 101 is connected, through the transmission controller 102, with the back-end processor 103.

Specifically, the front-end processor 101 is configured to schedule transmission of data in the front-end memory, and send the data to the transmission controller 102. Serving as a transmission channel for the front-end processor 101 and the back-end processor 103, the transmission controller 102 sends data to the back-end processor 103. The back-end processor 103 is configured to schedule the transmitted data and then transmit it to the back-end memory or an external storage device.

In this embodiment, the front-end processor 101 includes a DMA controller 1011, a transmission scheduler 1012, a memory controller 1013, and a plurality of transmission buffers; the DMA controller 1011 is respectively connected with the transmission controller 102, the memory controller 1013, respective transmission buffers and the transmission scheduler 1012, the transmission controller 102 and the transmission scheduler 1012 are respectively connected with the respective transmission buffers.

In this embodiment, the DMA controller 1011 is configured to: receive a request for data transmission sent by the back-end processor 103; send, according to the request for data transmission, a data reading instruction to the memory controller 1013; and receive read data and send the read data to the transmission buffers. The memory controller 1013 is configured to: control, according to the data reading instruction, a memory to read data, and send the read data to the DMA controller 1011. The transmission scheduler 1012 is configured to: control the plurality of the transmission buffers to write data sent by the DMA controller 1011, and control the plurality of the transmission buffers to read data and transmit, through the transmission controller 102, the data to the back-end processor 103.

Specifically, in this embodiment, the DMA controller 1011 receives a request for data transmission sent by the back-end processor 103, where the request for data transmission includes transmission information; the DMA controller 1011 sends, according to the transmission information of the request for data transmission, a corresponding data reading instruction to the memory controller 1013; and the memory controller 1013 controls, according to the data reading instruction, the memory to read data, where the memory can read data from the front-end memory. And the read data is sent to the DMA controller 1011. The DMA controller 1011 receives the read data and sends it to the transmission buffer. When the DMA controller 1011 transmits data to a transmission buffer, the transmission scheduler 1012 controls, according to rules, respective transmission buffers to write data sent by DMA in turn, to make each transmission buffer having equal writing authority, that is, another transmission buffer continues to write data after one transmission buffer writes data. At the same time, the transmission scheduler 1012 controls, according to rules, respective transmission buffers to read data in turn and send it to the back-end processor 103 via the transmission controller 102. Each transmission buffer also has equal reading authority, that is, another transmission buffer continues to read data after one transmission buffer reads data.

There are two transmission buffers in FIG. 1, namely respectively a first transmission buffer 1014 and a second transmission buffer 1015.

The apparatus for data transmission provided in this embodiment includes a front-end processor 101, a transmission controller 102 and a back-end processor 103. The front-end processor 101 is connected, through the transmission controller 102, with the back-end processor 103. The front-end processor 101 includes a DMA controller 1011, a transmission scheduler 1012, a memory controller 1013, and a plurality of the transmission buffers; the DMA controller 1011 is respectively connected with the transmission controller 102, the memory controller 1013, respective transmission buffers and the transmission scheduler 1012, the transmission controller 102 and the transmission scheduler 1012 are respectively connected with the respective transmission buffers. The DMA controller 1011 is configured to: receive the request for data transmission sent by the back-end processor 103; send, according to the request for data transmission, a data reading instruction to the memory controller 1013; receive read data, and send it to the transmission buffers. The memory controller 1013 is configured to: control according to the data reading instruction, the memory to read data, and send the read data to the DMA controller 1011. The transmission scheduler 1012 is configured to: control the plurality of the transmission buffers to write data sent by the DMA controller 1011, control the plurality of the transmission buffers to read data, and transmit, through the transmission controller 102, the data to the back-end processor 103. Since in the front-end processor 101, the transmitted data can be scheduled in order, large data can be transmitted fast, and the data can be transmitted after the back-end processor 103 is ready to receive the data, thus the burden of the back-end processor 103 will not be increased and the consumption of a large amount of resources is avoided.

Further, in this embodiment, the DMA controller 1011 is specifically configured to control the data to be transmitted in a single frame manner or a multiple frame manner.

Specifically, in this embodiment, the DMA controller 1011 receives a request for data transmission sent by the back-end processor 103, where the request for data transmission includes transmission information, the transmission information can be single frame transmission information or multiple frame transmission information. When the DMA controller 1011 receives the read data and sends it to the transmission buffer, if the transmission information is the single frame transmission information, the data is sent to the transmission buffer in a single frame manner through direct memory access technology; if the transmission information is the multiple frame transmission information, the data is sent to the transmission buffer in a multiple frame manner through direct memory access technology.

Therefore, in the apparatus for data transmission provided in this embodiment, the DMA controller 1011 is specifically configured to control data to be transmitted in a single frame manner or a multiple frame manner, and is capable of transmitting the data through direct memory access technology, thus further accelerating the speed of data transmission.

Embodiment 2

Figure 2:
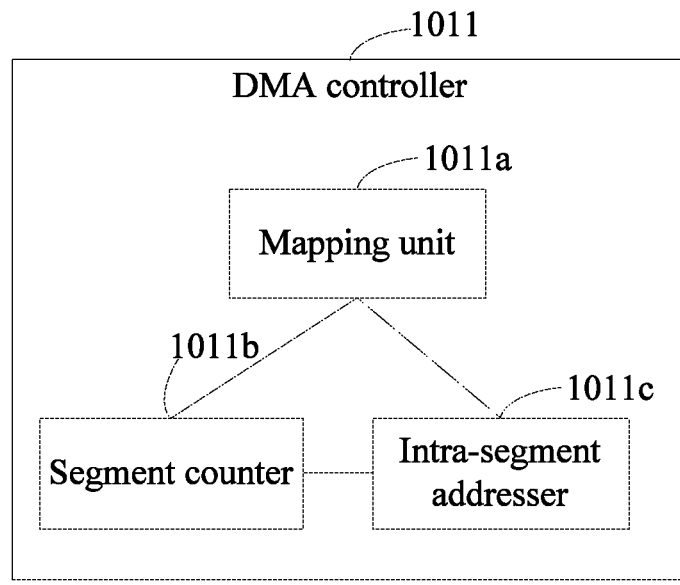
FIG. 2 is a schematic structural diagram of a DMA controller in an apparatus for data transmission provided in Embodiment 2 of the present application.

FIG. 2 is a first schematic structural diagram of a DMA controller 1011 in an apparatus for data transmission provided in Embodiment 2 of the present application; as shown in FIG. 2, the apparatus for data transmission provided in Embodiment 2 of the present application further refines the DMA controller 1011 of the front-end processor 101 based on the apparatus for data transmission provided in Embodiment 1 of the present application. In this embodiment, the DMA controller 1011 includes a mapping unit 1011*a*, a segment counter 1011*b* and an intra-segment addresser 1011*c*.

The mapping unit 1011*a* is respectively connected with the segment counter 1011*b* and the intra-segment addresser 1011*c*, and the segment counter 1011*b* is connected with the intra-segment addresser 1011*c*.

In this embodiment, the mapping unit 1011*a* is configured to: receive a request for single frame data transmission sent by the back-end processor 103, where the request for single frame data transmission includes frame start address and frame length information; and map the frame start address and the frame length information into intra-segment addressing information and segment counting information. The intra-segment addresser 1011*c* is configured to: update, according to the data sent by the DMA controller 1011, the intra-segment addressing information; send, if the intra-segment addressing in the intra-segment addressing information reaches a maximum value, segment count updating information to the segment counter 1011*b*; and set the intra-segment addressing in the intra-segment addressing information as an initial value of the intra-segment addressing to perform the intra-segment addressing of a next segment. The segment counter 1011*b* is configured to perform, if the segment count updating information is received, subtraction counting until a count in the segment counting information is an initial value of the segment counting.

Preferably, in this embodiment, the intra-segment addresser 1011*c* is specifically configured to: set the intra-segment addressing in the intra-segment addressing information as zero to perform the intra-segment addressing of the next segment. The segment counter 1011*b* is configured to perform, if the segment count updating information is received, counting by subtracting one until the count in the segment counting information is zero. That is, preferably, in this embodiment, the initial value of the intra-segment addressing in the intra-segment addresser 1011*c* is zero, and the subtraction counting performed by the segment counter 1011*b* is counting by subtracting one.

Specifically, in this embodiment, if the DMA controller 1011 controls data to be transmitted in a single frame manner, the DMA controller 1011 includes a mapping unit 1011*a*, a segment counter 1011*b* and an intra-segment addresser 1011*c*.

Firstly, the mapping unit 1011*a* receives a request for single frame data transmission sent by the back-end processor 103, where the request for single frame data transmission includes frame start address and frame length information. The frame start address is capable of representing the storage location of the single frame data, and the frame length information is the length of the single frame. The frame start address and the frame length information are mapped into intra-segment addressing information and segment counting information, that is, the single frame data with the frame start address is divided into multiple segments according to the frame length, and each segment includes multiple intra-segment addressing. An initial state after the frame start address and the frame length information are mapped into the intra-segment addressing information and the segment counting information is that, the segment counting information is the number of segments into which the single frame data is divided, the intra-segment addressing in the intra-segment addressing information is zero.

Secondly, the intra-segment addresser 1011*c* stores the intra-segment addressing information; at the same time, the data sent by the DMA controller 1011 is monitored and the intra-segment addressing is performed according to the data sent by the DMA controller 1011, that is, the intra-segment addressing information is updated, and the intra-segment addressing changes from small to large. If the intra-segment addressing in the intra-segment addressing information reaches the maximum value, it indicates that the received data reaches a segment, then the segment count updating information is sent to the segment counter 1011*b*, meanwhile, in order to perform the intra-segment addressing of the next segment, the intra-segment addressing in the intra-segment addressing information is set as zero to continue the intra-segment addressing of the next segment according to the data sent by the memory controller 1013.

The segment count updating information indicates information that the segment counter 1011*b* performing counting by subtracting one.

The segment counter 1011*b* stores the segment counting information; if the segment count updating information is received, it indicates that the intra-segment addressing in the intra-segment addresser 1011*c* has reached the maximum value, and the data of the current segment has been received, so it is necessary to perform the intra-segment addressing of the next segment; then, the segment counter subtracts one from the number of the segments in the segment counting information and continues counting of the next segment. If the intra-segment addressing in the intra-segment addresser reaches the maximum value and the count in the segment counting information of the segment counter 1011*b* is zero, it indicates that the single frame data has been received.

In the apparatus for data transmission provided in this embodiment, the DMA controller 1011 includes a mapping unit 1011*a*, a segment counter 1011*b* and an intra-segment addresser 1011*c*, which can accurately count and transmit the single frame data according to the request for single frame data transmission from the back-end processor 103.

Embodiment 3

Figure 3:
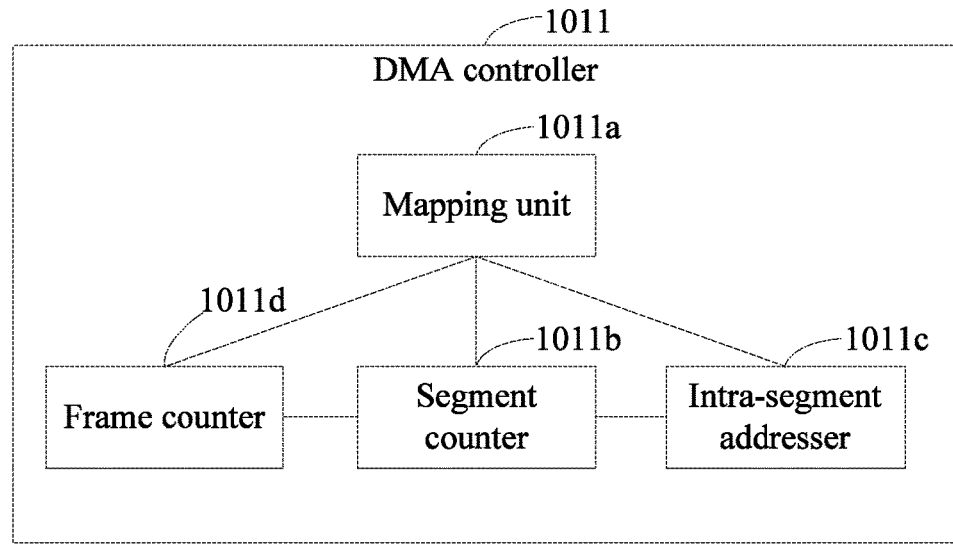
FIG. 3 is a schematic structural diagram of a DMA controller in an apparatus for data transmission provided in Embodiment 3 of the present application.

FIG. 3 is a schematic structural diagram of a DMA controller 1011 in an apparatus for data transmission provided in Embodiment 3 of the present application; as shown in FIG. 3, the apparatus for data transmission provided in embodiment 3 of the present application further refines the DMA controller 1011 of the front-end processor 101 based on the apparatus for data transmission provided in Embodiment 1 of the present application. In this embodiment, the DMA controller 1011 includes a mapping unit 1011*a*, an intra-segment addresser 1011*c*, a segment counter 1011*b* and a frame counter 1011*d*.

The mapping unit 1011*a* is respectively connected with the frame counter 1011*d*, the segment counter 1011*b* and the intra-segment addresser 1011*c*, and the segment counter 1011*b* is respectively connected with the intra-segment addresser 1011*c* and the frame counter 1011*d*.

In this embodiment, the mapping unit 1011*a* is configured to: receive a request for multiple frame data transmission sent by the back-end processor 103, where the request for multiple frame data transmission includes a number of frames, frame start address and frame length information; and map the number of frames, the frame start address and the frame length information into intra-segment addressing information, segment counting information and frame counting information. The intra-segment addresser 1011*c* is configured to update, according to the data sent by the DMA controller 1011, the intra-segment addressing information; send, if the intra-segment addressing in the intra-segment addressing information reaches the maximum value, segment count updating information to the segment counter 1011*b*; and set the intra-segment addressing in the intra-segment addressing information as the initial value of the intra-segment addressing to perform the intra-segment addressing of the next segment. The segment counter 1011*b* is configured to: perform, if the segment count updating information is received, subtraction counting; and send, if a count in the segment counting information is the initial value of the segment counting, frame count updating information to the frame counter; and set the count in the segment counting information as the maximum value to perform the segment counting of the next frame. The frame counter 1011*d* is configured to perform, if the frame count updating information is received, subtraction counting until a count in the frame counting information is an initial value of the frame counting.

Preferably, in this embodiment, the intra-segment addresser 1011*c* is specifically configured to: set the intra-segment addressing in the intra-segment addressing information as zero to perform the intra-segment addressing of a next segment. The segment counter 1011*b* is specifically configured to: perform, if the segment counter receives the segment count updating information, counting by subtracting one; and send, if the count in segment counting information is zero, frame count updating information to the frame counter 1011*d*; the frame counter 1011*d* is specifically configured to perform, if the frame count updating information is received, counting by subtracting one until the count in the frame counting information is zero. That is, preferably, in this embodiment, the initial value of the intra-segment addressing in the intra-segment addresser 1011*c* is zero. The subtraction counting performed by the segment counter 1011*b* is counting by subtracting one, and the initial value of the segment counting is zero. The subtraction counting performed in the frame counter 1011*d* is counting by subtracting one, and the initial value of the frame counting is zero.

Specifically, in this embodiment, if the DMA controller 1011 controls data to be transmitted in a multiple frame manner, the DMA controller 1011 includes a mapping unit 1011a, an intra-segment addresser 1011c, a segment counter 1011b and a frame counter 1011d.

Firstly, the mapping unit 1011a receives a request for multiple frame data transmission sent by the back-end processor 103, where the request for multiple frame data transmission includes the number of frames, frame start address and frame length information. The number of frames is the number of frames transmitted during multiple frame data transmission, the storage position of multiple frame data can be determined according to the frame start address, and the frame length information is the length of each frame. The number of frames, the frame start address and the frame length information are mapped into intra-segment addressing information, segment counting information and frame counting information, that is, the multiple frame data with the frame start address is divided into multiple frames according to the number of frames, and each frame is divided into multiple segments according to the frame length, each segment includes multiple intra-segment addressing. In the initial state after the number of frames, the frame start address and the frame length information are mapped into the intra-segment addressing information, segment counting information and frame counting information, the frame counting information is the number of frames included in the multiple frame data, the segment counting information is the number of segments included in the single frame data, and the intra-segment addressing in the intra-segment addressing information is zero.

Secondly, the intra-segment addresser 1011c stores the intra-segment addressing information, where an initial state of the intra-segment addressing information is zero; at the same time, the data sent by the DMA controller 1011 is monitored and the intra-segment addressing is performed according to the data sent by the DMA controller 1011, that is, the intra-segment addressing information is updated, and the intra-segment addressing changes from small to large. If the intra-segment addressing in the intra-segment addressing information reaches the maximum value, it indicates that the received data reaches a segment, then the segment count updating information is sent to the segment counter 1011b, meanwhile, in order to perform the intra-segment addressing of the next segment, the intra-segment addressing in the intra-segment addressing information is set as zero to continue the intra-segment addressing of the next segment according to the data sent by the memory controller 1013.

Furthermore, the segment counter 1011b stores the segment counting information, an initial state of the segment counting information is the number of segments included in each frame of data; if the segment count updating information is received, it indicates that the intra-segment addressing in the intra-segment addresser 1011c has reached the maximum value, and the data of the current segment has been received, so it is necessary to perform the intra-segment addressing of the next segment again; then, the segment counter subtracts one from the number of the segments of the segment counting information; during the process of counting by subtracting one, if the count in the segment counting information becomes zero, it indicates that the transmission of the frame data is completed, then the frame count updating information is sent to the frame counter 1011d, and the count in the segment counting information is set as the maximum value, so that the segment counting of the next frame can be performed.

The frame counter 1011d stores the frame counting information, an initial state of the frame counting information is the number of frames of the multiple frame transmission; if the frame count updating information is received, it indicates that the data of the current frame has been received, and it is necessary to receive data of the next frame, then counting by subtracting one is performed. Every time data of one frame is received, the frame count updating information is counted by subtracting one until the count in the frame counting information is zero.

It can be understood that, if the intra-segment addressing in the intra-segment addresser 1011c reaches the maximum value, the segment count in the segment counter is zero, and the frame count in the frame counter 1011d is zero, it indicates that the multiple frame data transmission is completed.

In the apparatus for data transmission provided in this embodiment, the DMA controller 1011 includes a mapping unit 1011a, an intra-segment addresser 1011c, a segment counter 1011b and a frame counter 1011d, which can accurately count and transmit multiple frame data according to the request for multiple frame data transmission from the back-end processor 103.

Embodiment 4

Figure 4:
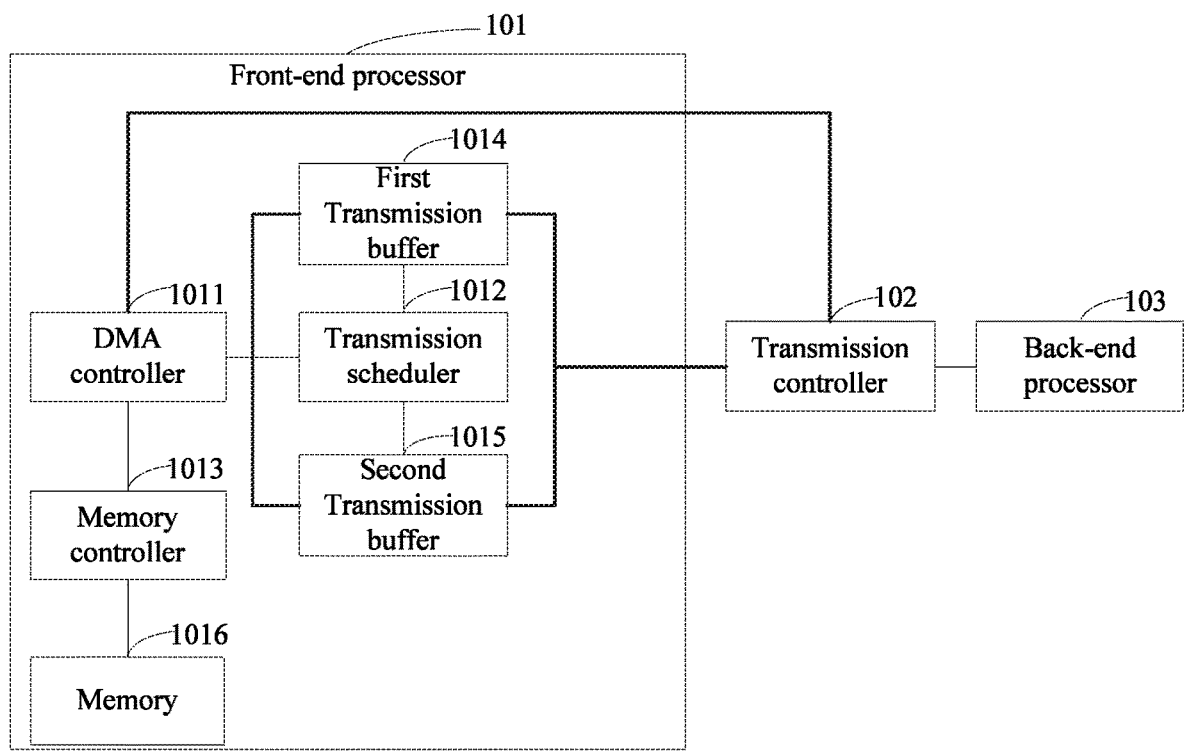
FIG. 4 is a schematic structural diagram of an apparatus for data transmission provided in Embodiment 4 of the present application.
Figure 5:
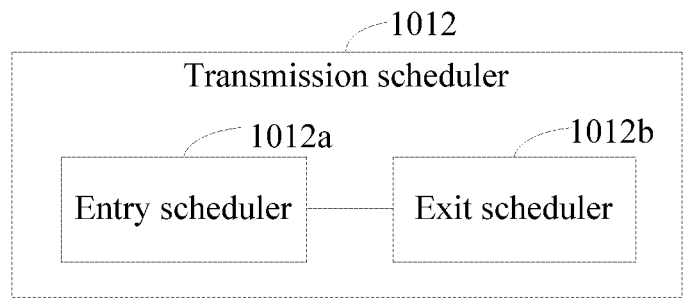
FIG. 5 is a schematic structural diagram of a transmission scheduler in the apparatus for data transmission provided in Embodiment 4 of the present application.

FIG. 4 is a schematic structural diagram of an apparatus for data transmission provided in Embodiment 4 of the present application. As shown in FIG. 4, the apparatus for data transmission provided in this embodiment is based on the apparatus for data transmission provided in Embodiment 1 or Embodiment 2 or Embodiment 3 of the present application, where the front-end processor 101 further includes a memory 1016. And the transmission scheduler 1012 is further refined. FIG. 5 is a structural diagram of a transmission scheduler 1012 in the apparatus for data transmission provided in Embodiment 4 of the present application; as shown in FIG. 5, the transmission scheduler 1012 provided in this embodiment includes an entry scheduler 1012a and an exit scheduler 1012b;

The entry scheduler 1012a is configured to control, according to an entry scheduling state and writing token information, a transmission buffer with writing authority to write data; the exit scheduler 1012b is configured to control, according to an exit scheduling state and reading token information, a transmission buffer with reading authority to read data.

Figure 6:
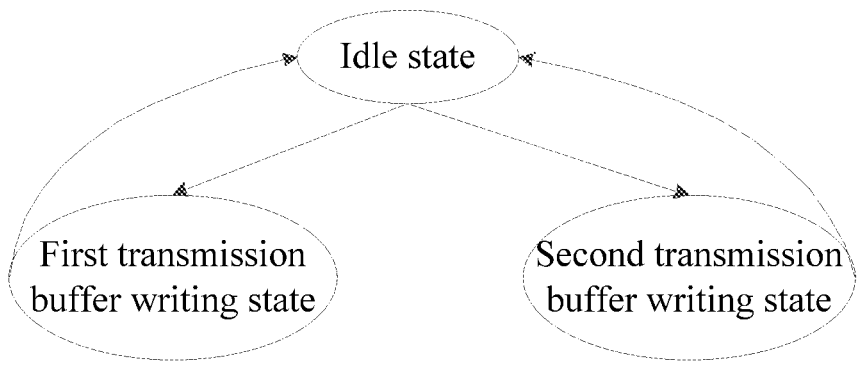
FIG. 6 is a schematic diagram of the jumping of the entry scheduling state of an entry scheduler in the apparatus for data transmission provided in Embodiment 4 of the present application.

Further, in this embodiment, FIG. 6 is a schematic diagram of the jumping of the entry scheduling state of the entry scheduler in the apparatus for data transmission provided in Embodiment 4 of the present application; as shown in FIG. 6, in this embodiment, the entry scheduling state includes an idle state and a plurality of transmission buffer writing states. The idle state is an initial state of the entry scheduler. If there are two transmission buffers, the plurality of the transmission buffer writing states include a first transmission buffer writing state and a second transmission buffer writing state. The first transmission buffer writing state indicates that the current state is a state to write to the first transmission buffer, and the second transmission buffer writing state indicates that the current state is a state to write to the second transmission buffer.

The writing token information includes an identification of a transmission buffer, and the writing token information indicates information that a certain transmission buffer has the authority to write data.

Further, in this embodiment, the entry scheduler 1012a is specifically configured to: control, if the entry scheduling state is the idle state and the writing token information is certain writing token information, the idle state to jump to a transmission buffer writing state corresponding to the certain writing token information; and control the transmission buffer corresponding to the transmission buffer writing state to write data.

Further, the entry scheduler 1012a is further configured to: update, if written data of a current transmission buffer reaches a first preset length value, the current transmission buffer writing state to the idle state; and update current writing token information to another writing token information.

The first preset length value is a preset length value of data written by each transmission buffer every time. For example, it may be 256 bits or other values, which is not limited in this embodiment.

Further, the entry scheduler 1012a is specifically configured to: determine, according to waiting time for writing of each transmission buffer, a transmission buffer with longest waiting time for writing; and update the current writing token information to writing token information of the transmission buffer with the longest waiting time for writing.

The waiting time for writing of the transmission buffer is a time interval from the time when a writing of previous data is completed to the time when a writing of next data is started.

Specifically, in this embodiment, the entry scheduler 1012a determines, according to the waiting time for writing of each transmission buffer, the transmission buffer with the longest waiting time for writing; and updates the current writing token information to the writing token information of the transmission buffer with the longest waiting time for writing, so that the plurality of the transmission buffers can have equal writing authority. When data is not written initially, the waiting time for writing in respective transmission buffers are the same, and the order of writing data in the plurality of the transmission buffers can be predefined. In this embodiment, two transmission buffers are taken as an example. That is, the entry scheduling state includes an idle state and two transmission buffer writing states. Then, in the entry scheduler 1012a, the entry scheduling state is in the initial state firstly; when the DMA controller 1011 has data to write, the writing token information is first writing token information, that is, the first transmission buffer 1014 has the authority to write data; when the entry scheduling state is the idle state and the writing token information is the first writing token information, the idle state is controlled to jump to the first transmission buffer writing state and the first transmission buffer 1014 is controlled to write data. In the process of writing data of the first transmission buffer 1014, the length of the written data is counted. If the written data of the first transmission buffer 1014 reaches a first preset length value, the first transmission buffer writing state is updated to the idle state, and certain writing token information is updated; when updating the certain writing token information, it is determined that the waiting time for writing of the second transmission buffer 1015 is longer than that of the first transmission buffer 1014, then the certain writing token information is updated to a second writing token information, indicating that the second transmission buffer 1015 has the authority to write data, and then the idle state is controlled to jump to the second transmission buffer writing state, and the second transmission buffer 1015 is controlled to write data. By repeating this cycle, the two transmission buffers have equal writing authority and perform writing data equally.

In the apparatus for data transmission provided in this embodiment, the transmission scheduler includes an entry scheduler and an exit scheduler. The entry scheduler is configured to control, according to the entry scheduling state and the writing token information, the transmission buffer with writing authority to write data. The entry scheduling state includes: an idle state and a plurality of the transmission buffer writing state; the entry scheduler is specifically configured to: control, if the entry scheduling state is the idle state and the writing token information is certain writing token information, the idle state to jump to a transmission buffer writing state corresponding to the certain writing token information; and control a transmission buffer corresponding to the transmission buffer writing state to write data. The entry scheduler is specifically configured to: determine, according to the waiting time for writing of each transmission buffer, the transmission buffer with the longest waiting time for writing; and update the current writing token information to the writing token information of the transmission buffer with the longest waiting time for writing. By setting a plurality of entry scheduling states and writing token information, the plurality of the transmission buffers are made to have equal writing authority, and so that each transmission buffer can be fast scheduled to write data.

Figure 7:
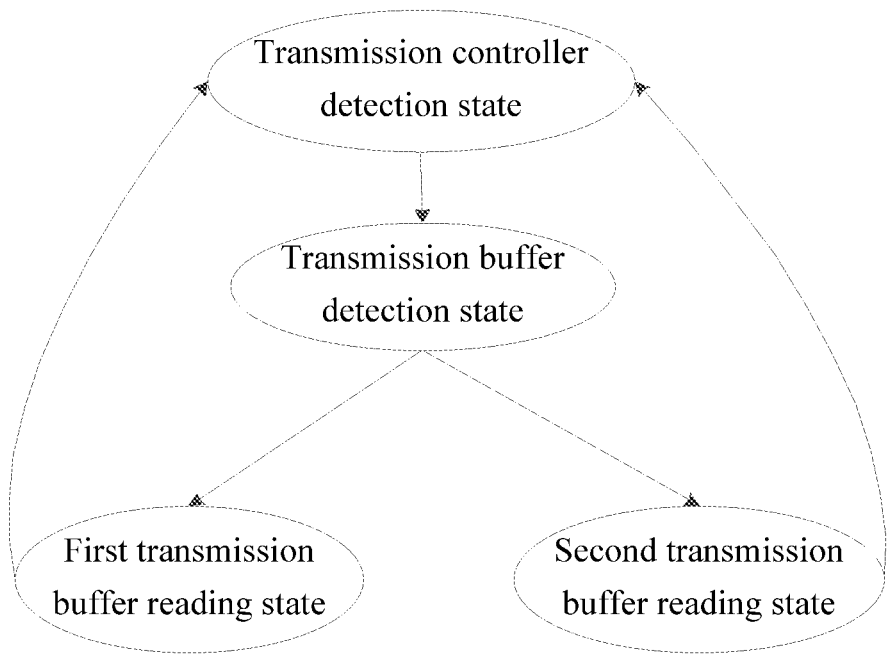
FIG. 7 is a schematic diagram of the jumping of the exit scheduling state of an exit scheduler in the apparatus for data transmission provided in Embodiment 4 of the present application.

Further, in this embodiment, FIG. 7 is a schematic diagram of the jumping of the exit scheduling state of the exit scheduler in the apparatus for data transmission provided in Embodiment 4 of the present application; as shown in FIG. 7, in this embodiment, the exit scheduling state includes a transmission controller detection state, a transmission buffer detection state and a plurality of transmission buffer reading states.

The transmission controller detection state is a state of detecting the transmission controller 102, and the transmission controller may be a USB controller. The transmission buffer detection state is a state of detecting a transmission buffer. If there are two transmission buffers, the plurality of the transmission buffer reading states include a first transmission buffer reading state and a second transmission buffer reading state. The first transmission buffer reading state indicates that a current state is a state that the first transmission buffer 1014 is reading data, and the second transmission buffer reading state indicates that the current state is a state that the second transmission buffer 1015 is reading data. The transmission controller detection state is an initial state of the exit scheduler.

Further, in this embodiment, the exit scheduler 1012b is specifically configured to: if the exit scheduling state is a transmission controller detection state and the reading token information is certain reading token information, control the transmission controller detection state to jump to the transmission buffer detection state after the transmission controller passing a detection, control the transmission buffer detection state to jump to a transmission buffer reading state corresponding to the certain reading token information after the transmission buffer passing a detection, and control a transmission buffer corresponding to the transmission buffer reading state to read data.

Further, in this embodiment, the exit scheduler 1012b is further configured to: update, if read data of a current transmission controller reaches a second preset length value, the current transmission buffer reading state to the transmission controller detection state; and update current reading token information to another reading token information.

The reading token information includes the identification of the transmission buffer, and the reading token information indicates information that a certain transmission buffer has the authority to read data.

The second preset length value is a preset length value of data read by each transmission buffer each time. For example, it may be 256 bits or other values, which is not limited in this embodiment.

Further, in this embodiment, the exit scheduler 1012b is specifically configured to: determine, according to waiting time for reading of each transmission buffer, a transmission buffer with longest waiting time for reading; and update the current reading token information to reading token information of the transmission buffer with the longest waiting time for reading.

The waiting time for reading of the transmission buffer is the time interval from the time when a reading of previous data is completed to the time when a reading of next data is started.

Specifically, in this embodiment, the exit scheduler 1012b determines, according to the waiting time for reading of each transmission buffer, the transmission buffer with the longest waiting time for reading; and updates the current reading token information to the reading token information of the transmission buffer with the longest waiting time for reading, so that the plurality of the transmission buffers can have equal reading authority. In this embodiment, two transmission buffers are taken as an example. That is, the exit scheduling states include a transmission controller detection state, a transmission buffer detection state, a first transmission buffer reading state and a second transmission buffer reading state. In the exit scheduler 1012b, firstly, the exit scheduling state is in the initial state to read data from a certain transmission buffer and transmit the data to the transmission controller 102. If the exit scheduling state is the transmission controller detection state and the reading token information is a first reading token information, it indicates that the first transmission buffer 1014 has reading authority and the exit scheduling state is in the initial state. After detecting that the transmission controller 102 is ready to receive data, the transmission controller detection state is jumped to the transmission buffer detection state; and after detecting that the first transmission buffer 1014 is ready to read data, the transmission buffer detection state is jumped to the first transmission buffer reading state, and the first transmission buffer 1014 is controlled to read data. In the process of reading data of the first transmission buffer 1014, the length of the read data is counted. If the read data of the first transmission buffer 1014 reaches a second preset length value, the first transmission buffer reading state is updated to the transmission controller detection state, and a first reading token information is updated; when updating the first reading token information, it is determined that the waiting time for reading of the second transmission buffer 1015 is longer than that of the first transmission buffer 1014, the first reading token information is updated to a second reading token information, indicating that the second transmission buffer 1015 has the authority to read data; then after transmission controller 102 is ready to receive data, the transmission controller detection state is jumped to transmission buffer detection state, after detecting that the second transmission buffer 1015 is ready to read data, the transmission buffer detection state is jumped to the second transmission buffer reading state, and the second transmission buffer 1015 is controlled to read data. By repeating this cycle, the two transmission buffers have equal reading authority and perform reading data equally.

In the apparatus for data transmission provided in this embodiment, the transmission scheduler 1012 includes an exit scheduler. The exit scheduler is configured to control, according to the exit scheduling state and the reading token information, the transmission buffer with reading authority to read data. The exit scheduling state includes a transmission controller detection state, a transmission buffer detection state, and the plurality of the transmission buffer reading states; the exit scheduler is specifically configured to: if the exit scheduling state is a transmission controller detection state and the reading token information is certain reading token information, control the transmission controller detection state to jump to the transmission buffer detection state after the transmission controller passing a detection, control the transmission buffer detection state to jump to a transmission buffer reading state corresponding to the certain reading token information after the transmission buffer passing a detection, and control the transmission buffer to read data. The exit scheduler is specifically configured to: determine, according to the waiting time for reading of each transmission buffer, a transmission buffer with the longest waiting time for reading; and update the current reading token information to the reading token information of the transmission buffer with the longest waiting time for reading. By setting a plurality of exit scheduling states and reading token information, the plurality of the transmission buffers are made to have equal reading authority, and so that each transmission buffer can be fast scheduled to read data.

Further, in this embodiment, the front-end controller further includes a memory 1016.

The memory 1016 is connected with the memory controller 1013 and configured to read data from the front-end memory under the control of the memory controller 1013.

Embodiment 5

The apparatus for data transmission provided in Embodiment 5 of the present application further refines the transmission controller 102 and the back-end processor 103 based on the apparatus for data transmission provided in Embodiment 4 of the present application.

Figure 8:
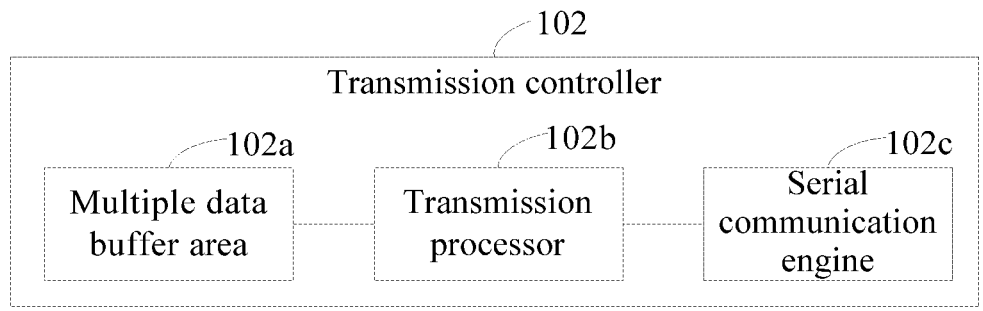
FIG. 8 is a schematic structural diagram of a transmission controller in the apparatus for data transmission provided in Embodiment 5 of the present application.

FIG. 8 is a schematic structural diagram of a transmission controller 102 in the apparatus for data transmission provided in Embodiment 5 of the present application; as shown in FIG. 8, in this embodiment, the transmission controller 102 includes a multiple data buffer area 102a, a transmission processor 102b and a serial communication engine 102c.

The transmission processor 102b is respectively connected with the multiple data buffer area 102a and the serial communication engine 102c.

Specifically, the multiple data buffer area 102a is configured to cache data. The transmission processor 102b is configured to send data in the multiple data buffer area 102a to the serial communication engine 102c. The serial communication engine 102c is configured to receive data sent by the transmission processor 102b and send the data to the back-end processor 103.

In this embodiment, the transmission controller 102 adopts a USB 3.0 controller.

In the apparatus for data transmission provided in this embodiment, the transmission controller 102 includes a multiple data buffer area 102a, a transmission processor 102b and a serial communication engine 102c; where the multiple data buffer area 102a is configured to cache data; the transmission processor 102b is configured to send data in the multiple data buffer area 102a to the serial communication engine 102c; the serial communication engine 102c is configured to receive data sent by the transmission processor 102b and send the data to the back-end processor 103; since the multiple data buffer area can effectively cache data, it can effectively prevent the data from being directly transmitted to the back-end processor, the back-end processor from being unable to store the data in time, and data from being accumulated.

Further, in this embodiment, the back-end processor 103 includes a multi-core CPU.

Specifically, the multi-core CPU is configured to transmit, in a parallel manner, data to the back-end memory.

In the apparatus for data transmission provided in this embodiment, the back-end processor 103 transmits, by using a multi-core CPU, data to the back-end memory in a parallel manner, which can further accelerate the data transmission.

Embodiment 6

Figure 9:
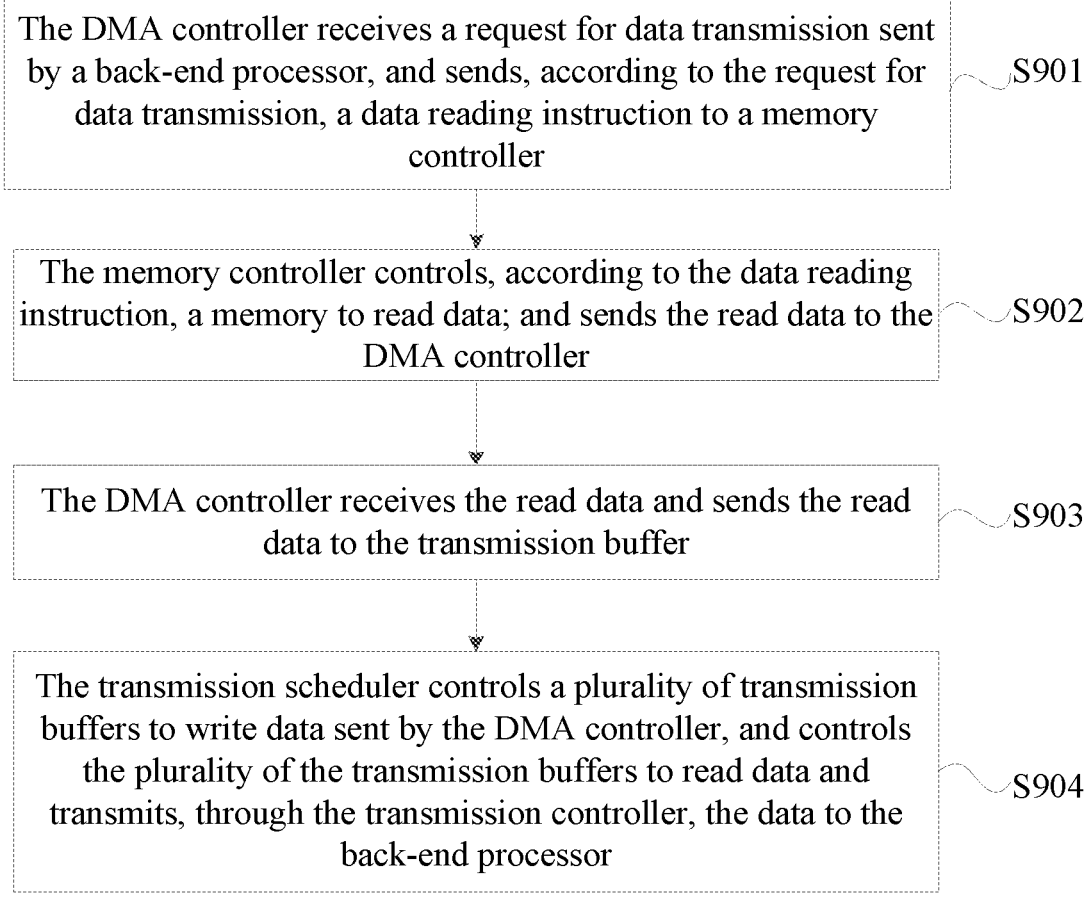
FIG. 9 is a flowchart of the method for data transmission provided in Embodiment 6 of the present application.

FIG. 9 is a flowchart of the method for data transmission provided in Embodiment 6 of the present application; as shown in FIG. 9, the execution subject of the method for data transmission provided in this embodiment is an apparatus for data transmission, then the method for data transmission provided in this embodiment includes the following steps.

At step 901, the DMA controller receives a request for data transmission sent by a back-end processor, and sends, according to the request for data transmission, a data reading instruction to a memory controller.

At step 902, the memory controller controls, according to the data reading instruction, a memory to read data; and sends the read data to the DMA controller.

At step 903, the DMA controller receives the read data and sends the read data to the transmission buffer.

At step 904, the transmission scheduler controls a plurality of transmission buffers to write data sent by the DMA controller, and controls the plurality of the transmission buffers to read data and transmits, through the transmission controller, the data to the back-end processor.

In this embodiment, the apparatus for data transmission provided in Embodiment 1 of the present application can be used to execute the technical solution of the method for data transmission in this embodiment; implementation principles and technical effects therebetween are similar, which will not be repeated one by one herein.

Further, in this embodiment, step 903 specifically includes:

the DMA controller controls, the data to be transmitted in a single frame manner or a multiple frame manner.

According to the method for data transmission provided in this embodiment, the DMA controller controls data to be transmitted in a single frame manner or a multiple frame manner, and is capable of transmitting the data through direct memory access technology, thus further accelerates the speed of data transmission.

Embodiment 7

FIG. 10 is a flowchart of the method for data transmission provided in Embodiment 7 of the present application; as shown in FIG. 10, the method for data transmission provided in this embodiment further refines the step 901 and step 903 based on the method for data transmission provided in Embodiment 6 of the present application, where the DMA controller includes a mapping unit, a segment counter and an intra-segment addresser. In the method for data transmission in this embodiment, the DMA controller controls data to be transmitted in a single frame manner, then the method for data transmission provided in this embodiment includes the following steps.

In step 1001, the mapping unit receives a request for single frame data transmission sent by the back-end processor, where the request for single frame data transmission includes frame start address and frame length information; and sends, according to the request for single frame data transmission, a data reading instruction to the memory controller.

At step 1002, the memory controller controls, according to the data reading instruction, a memory to read data; and sends the read data to the DMA controller.

At step 1003, the DMA controller controls the data to be transmitted in a single frame manner.

Further, the DMA controller controls, the data to be transmitted in a single frame manner specifically includes:

At step 1003*a*, the mapping unit maps the frame start address and the frame length information into intra-segment addressing information and segment counting information.

At step 1003*b*, the intra-segment addresser updates, according to the data sent by the DMA controller, the intra-segment addressing information; sends, if the intra-segment addressing in the intra-segment addressing information reaches the maximum value, segment count updating information to the segment counter; and sets the intra-segment addressing in the intra-segment addressing information as the initial value of the intra-segment addressing to perform the intra-segment addressing of the next segment.

Preferably, in this embodiment, in step 1003*b*, the intra-segment addresser sets the intra-segment addressing in the intra-segment addressing information as the initial value of the intra-segment addressing to perform the intra-segment addressing of the next segment specifically includes:

the intra-segment addresser sets the intra-segment addressing in the intra-segment addressing information as zero to perform the intra-segment addressing of the next segment.

That is, preferably, in this embodiment, the initial value of the intra-segment addressing in the intra-segment addresser is zero.

At step 1003*c*, the segment counter performs, if the segment count updating information is received, subtraction counting until the count in the segment counting information is the initial value of the segment counting.

Preferably, in this embodiment, step 1003*c* specifically is:

the segment counter performs, if the segment count updating information is received, counting by subtracting one until the count in the segment counting information is zero.

That is, preferably, in this embodiment, the subtraction counting performed by the segment counter is counting by subtracting one, and the initial value of the segment counting is zero.

At step 1004, the transmission scheduler controls a plurality of transmission buffers to write data sent by the DMA controller, and controls the plurality of the transmission buffers to read data and transmits, through the transmission controller, the data to the back-end processor.

In this embodiment, the apparatus for data transmission provided in Embodiment 2 of the present application can be used to execute the technical solution of the method for data transmission in this embodiment; implementation principles and technical effects therebetween are similar, which will not be repeated one by one herein.

Embodiment 8

Figure 11:
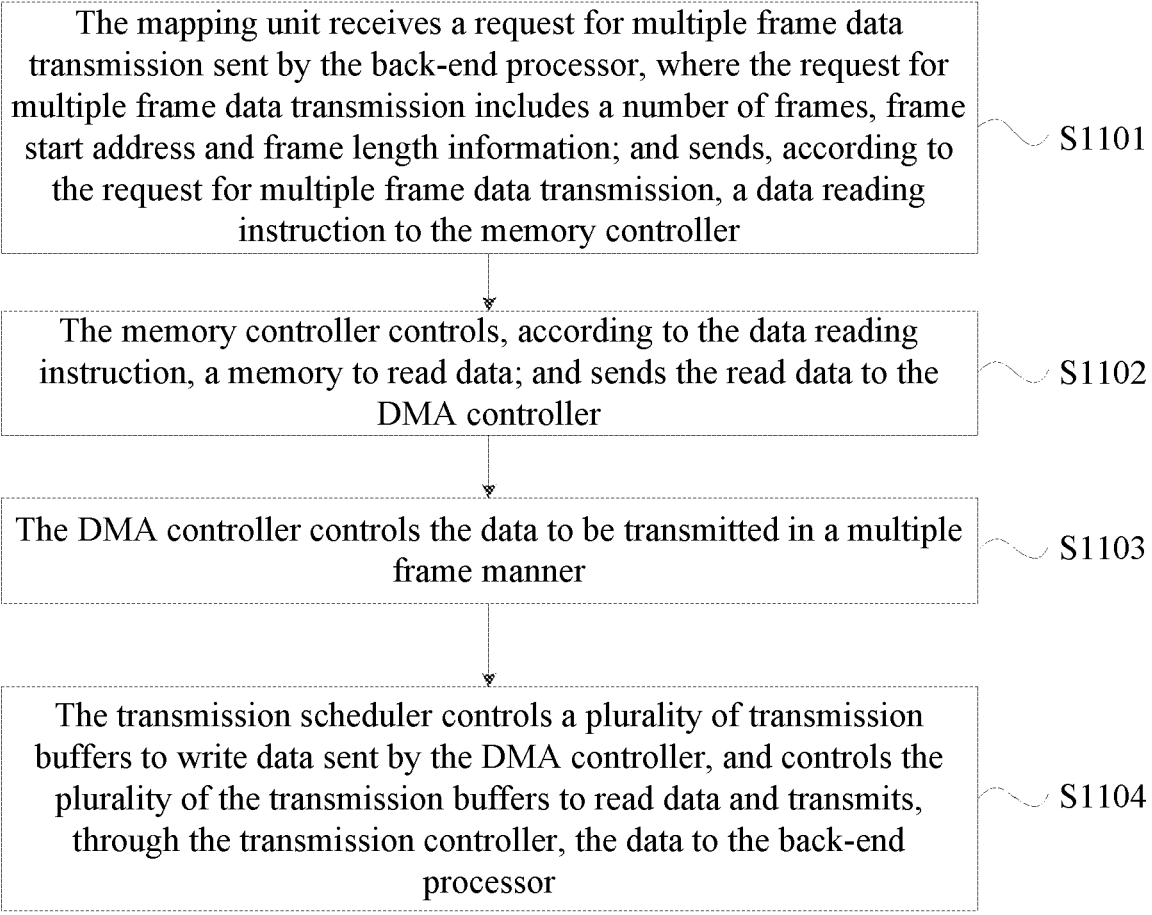
FIG. 11 is a flowchart of the method for data transmission provided in Embodiment 8 of the present application.

FIG. 11 is a flowchart of the method for data transmission provided in Embodiment 8 of the present application; as shown in FIG. 11, the method for data transmission provided in this embodiment further refines the step 901 and step 903 based on the method for data transmission provided in Embodiment 6 of the present application, where the DMA controller includes a mapping unit, an intra-segment addresser, a segment counter and a frame counter. In the method for data transmission in this embodiment, the DMA controller controls data to be transmitted in a multiple frame manner, then the method for data transmission provided in this embodiment includes the following steps.

At step 1101, the mapping unit receives a request for multiple frame data transmission sent by the back-end processor, where the request for multiple frame data transmission includes a number of frames, frame start address and frame length information; and sends, according to the request for multiple frame data transmission, a data reading instruction to the memory controller.

At step 1102, the memory controller controls, according to the data reading instruction, a memory to read data; and sends the read data to the DMA controller.

At step 1103, the DMA controller controls the data to be transmitted in a multiple frame manner.

Further, in this embodiment, step 1103 specifically includes the following steps:

At step 1103a, the mapping unit maps the number of frames, the frame start address and the frame length information into intra-segment addressing information, segment counting information and frame counting information.

At step 1103b, the intra-segment addresser updates, according to the data sent by the DMA controller, the intra-segment addressing information; sends, if the intra-segment addressing in the intra-segment addressing information reaches the maximum value, segment count updating information to the segment counter; and sets the intra-segment addressing in the intra-segment addressing information as the initial value of the intra-segment addressing to perform the intra-segment addressing of the next segment.

Preferably, in this embodiment, in step 1103b, the intra-segment addresser sets the intra-segment addressing in the intra-segment addressing information as the initial value of the intra-segment addressing to perform the intra-segment addressing of the next segment specifically includes:

the intra-segment addresser sets the intra-segment addressing in the intra-segment addressing information as zero to perform the intra-segment addressing of the next segment.

That is, preferably, in this embodiment, the initial value of the intra-segment addressing in the intra-segment addresser is zero.

At step 1103c, the segment counter performs, if the segment count updating information is received, subtraction counting, and sends, if the count in the segment counting information is the initial value of the segment counting, frame count updating information to the frame counter, and sets the count in the segment counting information as the maximum value to perform the segment counting of the next frame.

Preferably, in this embodiment, step 1103c specifically includes:

the segment counter performs, if the segment count updating information is received, counting by subtracting one; and sends, if the count in segment counting information is zero, frame count updating information to the frame counter.

That is, preferably, in this embodiment, the subtraction counting performed by the segment counter is counting by subtracting one, and the initial value of the segment counting is zero.

At step 1103d, the frame counter performs, if the frame count updating information is received, subtraction counting until the count in the frame counting information is the initial value of the frame counting.

Preferably, in this embodiment, step 1103d specifically includes:

the frame counter performs, if the frame count updating information is received, counting by subtracting one until the count in the frame counting information is zero.

That is, preferably, in this embodiment, the subtraction counting performed in the frame counter is counting by subtracting one, and the initial value of the frame counting is zero.

At step 1104, the transmission scheduler controls a plurality of transmission buffers to write data sent by the DMA controller, and controls the plurality of the transmission buffers to read data and transmits, through the transmission controller, the data to the back-end processor.

In this embodiment, the apparatus for data transmission provided in Embodiment 3 of the present application can be used to execute the technical solution of the method for data transmission in this embodiment; implementation principles and technical effects therebetween are similar, which will not be repeated one by one herein.

Embodiment 9

Figure 12:
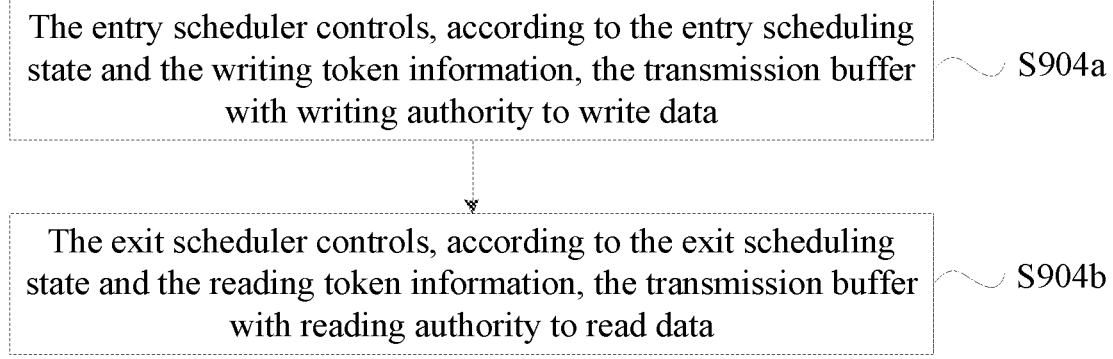
FIG. 12 is a flowchart of the method for data transmission provided in Embodiment 9 of the present application.

FIG. 12 is a flowchart of the method for data transmission provided in Embodiment 9 of the present application; as shown in FIG. 12, the method for data transmission provided in this embodiment further refines the step 904, step 1004 or step 1104 based on the method for data transmission provided in Embodiment 6, Embodiment 7 or Embodiment 8 of the present application, where the transmission scheduler includes an entry scheduler and an exit scheduler. The method for data transmission in this embodiment is based on Embodiment 1 of the present application, where in step 904, the transmission scheduler controls the plurality of the transmission buffers to write data sent by the DMA controller, and controls the plurality of the transmission buffers to read data and transmits, through the transmission controller, the data to the back-end processor specifically includes the following steps.

At step 904a, the entry scheduler controls, according to the entry scheduling state and the writing token information, the transmission buffer with writing authority to write data.

Further, the entry scheduler controls, according to the entry scheduling state and the writing token information, the transmission buffer with writing authority to write data specifically includes: controlling, if the entry scheduling state is the idle state and the writing token information is certain writing token information, the idle state to jump to a transmission buffer writing state corresponding to the certain writing token information; and controlling the transmission buffer corresponding to transmission buffer writing state to write data.

In this embodiment, after the controlling the transmission buffer to write data, the method further includes:

updating, if written data of a current transmission buffer reaches a first preset length value, the current transmission buffer writing state to the idle state; and updating the current writing token information to another writing token information.

Further, in this embodiment, the updating the current writing token information to another writing token information specifically includes:

the entry scheduler determines, according to the waiting time for writing of each transmission buffer, the transmission buffer with the longest waiting time for writing; and updates the current writing token information to the writing token information of the transmission buffer with the longest waiting time for writing.

At step 904*b*, the exit scheduler controls, according to the exit scheduling state and the reading token information, the transmission buffer with reading authority to read data.

Further, the exit scheduling state includes a transmission controller detection state, a transmission buffer detection state, and a plurality of transmission buffer reading states;

where the exit scheduler controls, according to the exit scheduling state and the reading token information, the transmission buffer with reading authority to read data specifically includes:

if the exit scheduling state is a transmission controller detection state and the reading token information is certain reading token information, controlling the transmission controller detection state to jump to the transmission buffer detection state after the transmission controller passing a detection, and controlling the transmission buffer detection state to jump to a transmission buffer reading state corresponding to the certain reading token information after the transmission buffer passing a detection, and controlling a transmission buffer corresponding to the transmission buffer reading state to read data.

In this embodiment, after the controlling the transmission buffer to read data, the method further includes:

updating, if current read data of the transmission controller reaches a second preset length value, the current transmission buffer reading state to the transmission controller detection state; and updating the current reading token information to another reading token information.

Further, in this embodiment, the updating the current reading token information to another reading token information specifically includes:

the exit scheduler determines, according to the waiting time for reading of each transmission buffer, a transmission buffer with the longest waiting time for reading, and updates the current reading token information to the reading token information of the transmission buffer with the longest waiting time for reading.

In this embodiment, the apparatus for data transmission provided in Embodiment 4 of the present application can be used to execute the technical solution of the method for data transmission in this embodiment; implementation principles and technical effects therebetween are similar, which will not be repeated one by one herein.

Embodiment 10

Figure 13:
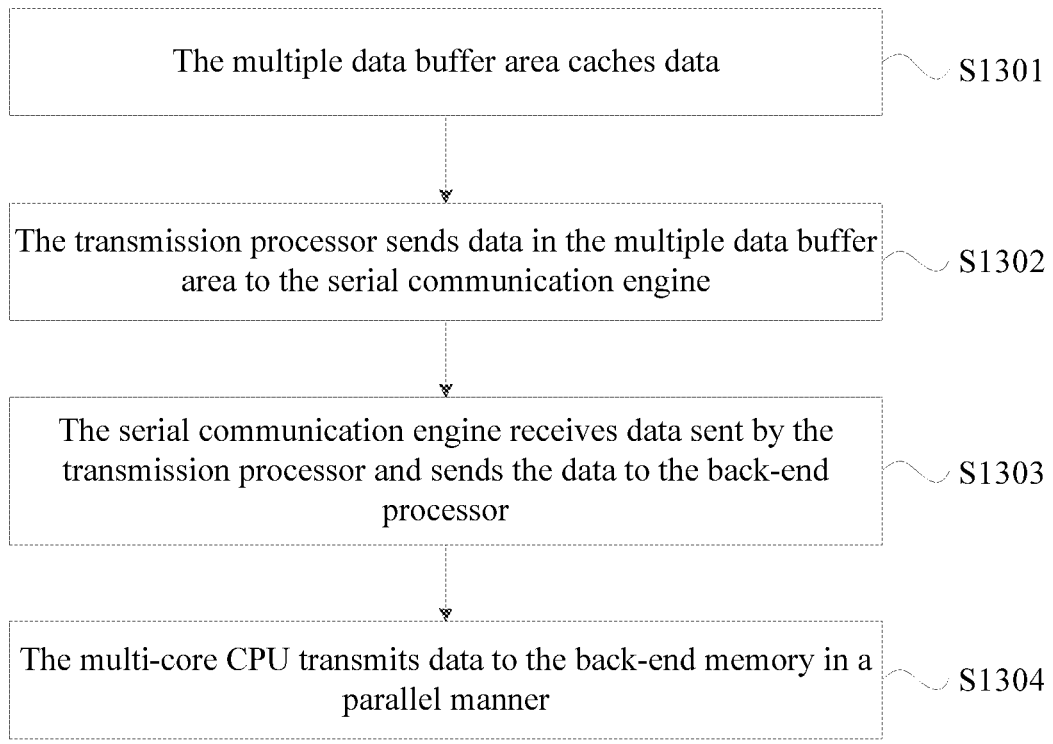
FIG. 13 is a flowchart of the method for data transmission provided in Embodiment of the present application.

FIG. 13 is a flowchart of the method for data transmission provided in Embodiment of the present application; the method for data transmission provided in this embodiment is based on the method for data transmission provided in Embodiment 6 of the present application, and further includes the following steps after the step 904.

At step 1301, the multiple data buffer area caches data.

At step 1302, the transmission processor sends data in the multiple data buffer area to the serial communication engine;

At step 1303, the serial communication engine receives data sent by the transmission processor and sends the data to the back-end processor.

At step 1304, the multi-core CPU transmits, in a parallel manner, data to the back-end memory.

In this embodiment, the apparatus for data transmission provided in Embodiment 5 of the present application can be used to execute the technical solution of the method for data transmission in this embodiment; implementation principles and technical effects therebetween are similar, which will not be repeated one by one herein.

Embodiment 11

Embodiment 11 of the present application further provides a computer readable storage medium stored with a computer program is executed by a processor to implement the method according to any one of Embodiments 1-5 of the present application.

From several embodiments provided by the present application, it should be understood that the disclosed apparatus and method can be implemented in other ways. For example, the embodiments of the apparatuses described above are only schematic. For example, the division of modules is only a logical function division. In process of actual implementation, there may be another way to divide; for example, multiple modules or components can be combined or integrated into another system, or some features can be ignored or not executed. On the other hand, the mutual coupling or direct coupling or communication connection shown or discussed may be indirect coupling or communication connection through some interfaces, apparatuses or modules, or may be in electrical, mechanical or other forms.

The modules described as separated components may or may not be physically separated, and the components displayed as modules may or may not be physical modules, that is, they may be located in one place or distributed on multiple network modules. Some or all of the modules can be selected according to actual needs to achieve the purpose of this embodiment.

In addition, respective functional modules in each embodiment of the present application may be integrated into one processing module, or respective modules may physically exist separately, or two or more modules may be integrated into one module. The above integrated modules can be implemented in the form of using hardware, or in the form of using hardware together with software functional modules.

The program code for implementing the method of the present application can be written by using one programming language or any combination of more programming languages. These program codes may be provided to a processor or controller of a general purpose computer, a special purpose computer, or other programmable data processing apparatus, such that the program codes, when executed by the processor or controller, cause the functions or operations specified in the flowcharts and/or block diagrams to be implemented. The program code can be executed completely on the machine, or partially on the machine, or partially on the machine as an independent software package and partially on a remote machine, or completely on a remote machine or server as an independent software package.

In the context of the present application, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include a one-or-more-wire-based electrical connections, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In addition, although that respective operations are depicted in a particular order, this should be understood as requiring that such operations be performed in the particular order shown or in a sequential order, or that all illustrated operations should be performed to achieve desired results. Under certain circumstances, multitask processing and parallel processing may be advantageous. Likewise, although several specific implementation details are included in the above discussion, these should not be interpreted as limitations on the scope of the present disclosure. Certain features described in the context of a separate embodiment may also be implemented in combination in a single implementation. On the contrary, various features described in the context of a single implementation may also be implemented in multiple implementations separately or in any suitable subcombination.

Although the subject matter has been described by using language specific to structural features and/or logical acts of methods, it should be understood that the subject matter defined in the appended claims is not necessarily limited to the specific features or acts described above. On the contrary, the specific features and acts described above are merely exemplary forms of implementing the claims.

What is claimed is:

1. An apparatus for data transmission, comprising: a front-end processor, a transmission controller and a back-end processor;
   the front-end processor is connected, through the transmission controller, with the back-end processor;
   the front-end processor comprises a direct memory access (DMA) controller, a transmission scheduler, a memory controller and a plurality of transmission buffers; wherein the DMA controller is respectively connected with the transmission controller, the memory controller, respective transmission buffers and the transmission scheduler, the transmission controller and the transmission scheduler are respectively connected with the respective transmission buffers;
   the DMA controller is configured to: receive a request for data transmission sent by the back-end processor; send, according to the request for data transmission, a data reading instruction to the memory controller; and receive read data and send the read data to the transmission buffers;
   the memory controller is configured to: control, according to the data reading instruction, a memory to read data; and send the read data to the DMA controller;
   the transmission scheduler is configured to: control the plurality of the transmission buffers to write data sent by the DMA controller, and control the plurality of the transmission buffers to read data and transmit, through the transmission controller, the data to the back-end processor.

2. The apparatus according to claim 1, wherein the DMA controller is specifically configured to control, the data to be transmitted in a single frame manner or a multiple frame manner.

3. The apparatus according to claim 2, wherein the DMA controller comprises a mapping unit, a segment counter and an intra-segment addresser;
   the mapping unit is respectively connected with the segment counter and the intra-segment addresser, and the segment counter is connected with the intra-segment addresser;
   the mapping unit is configured to: receive a request for single frame data transmission sent by the back-end processor, wherein the request for single frame data transmission comprises frame start address and frame length information; and map the frame start address and the frame length information into intra-segment addressing information and segment counting information;
   the intra-segment addresser is configured to: update, according to the data sent by the DMA controller, the intra-segment addressing information; send, when the intra-segment addressing in the intra-segment addressing information reaches a maximum value, segment count updating information to the segment counter; and set the intra-segment addressing in the intra-segment addressing information as an initial value of the intra-segment addressing to perform the intra-segment addressing of a next segment;
   the segment counter is configured to perform, when the segment count updating information is received, subtraction counting until a count in the segment counting information is zero.

4. The apparatus according to claim 3, wherein the intra-segment addresser is specifically configured to: set the intra-segment addressing in the intra-segment addressing information as zero to perform the intra-segment addressing of the next segment;
   the segment counter is configured to perform, when the segment count updating information is received, counting by subtracting one until the count in the segment counting information is zero.

5. The apparatus according to claim 2, wherein the DMA controller comprises: a mapping unit, an intra-segment addresser, a segment counter and a frame counter;
   the mapping unit is respectively connected with the frame counter, the segment counter and the intra-segment addresser, and the segment counter is respectively connected with the intra-segment addresser and the frame counter;
   the mapping unit is configured to: receive a request for multiple frame data transmission sent by the back-end processor, wherein the request for multiple frame data transmission comprises a number of frames, frame start address and frame length information; and map the number of frames, the frame start address and the frame length information into intra-segment addressing information, segment counting information and frame counting information;
   the intra-segment addresser is configured to: update, according to the data sent by the DMA controller, the intra-segment addressing information; send, when the intra-segment addressing in the intra-segment addressing information reaches a maximum value, segment count updating information to the segment counter; and set the intra-segment addressing in the intra-segment addressing information as an initial value of the intra-segment addressing to perform the intra-segment addressing of a next segment;
   the segment counter is configured to: perform, when the segment count updating information is received, subtraction counting; send, when a count in the segment counting information is zero, frame count updating information to the frame counter; and set the count in the segment counting information as the maximum value to perform the segment counting of the next frame;

the frame counter is configured to perform, when the frame count updating information is received, subtraction counting until a count in the frame counting information is zero.

6. The apparatus according to claim 5, wherein the intra-segment addresser is specifically configured to: set the intra-segment addressing in the intra-segment addressing information as zero and perform the intra-segment addressing of the next segment;

the segment counter is specifically configured to: perform, when the segment count updating information is received, counting by subtracting one; and send, when the count in the segment counting information is zero, frame count updating information to the frame counter;

the frame counter is specifically configured to perform, when the frame count updating information is received, counting by subtracting one until the count in the frame counting information is zero.

7. The apparatus according to claim 1, wherein the transmission scheduler comprises an entry scheduler and an exit scheduler;

the entry scheduler is configured to control, according to an entry scheduling state and writing token information, a transmission buffer with writing authority to write data;

the exit scheduler is configured to control, according to an exit scheduling state and reading token information, a transmission buffer with reading authority to read data.

8. The apparatus according to claim 7, wherein the entry scheduling state comprises an idle state and a plurality of transmission buffer writing states;

the entry scheduler is specifically configured to: control, when the entry scheduling state is the idle state and the writing token information is certain writing token information, the idle state to jump to a transmission buffer writing state corresponding to the certain writing token information; and control a transmission buffer corresponding to the transmission buffer writing state to write data.

9. The apparatus according to claim 8, wherein the entry scheduler is further configured to: update, when written data of a current transmission buffer reaches a first preset length value, a current transmission buffer writing state to the idle state; and update current writing token information to another writing token information.

10. The apparatus according to claim 9, wherein the entry scheduler is specifically configured to: determine, according to waiting time for writing of each transmission buffer, the transmission buffer with longest waiting time for writing; and update the current writing token information to the writing token information of the transmission buffer with the longest waiting time for writing.

11. The apparatus according to claim 7, wherein the exit scheduling state comprises a transmission controller detection state, a transmission buffer detection state, and a plurality of transmission buffer reading states;

the exit scheduler is specifically configured to: when the exit scheduling state is the transmission controller detection state and the reading token information is certain reading token information, control the transmission controller detection state to jump to the transmission buffer detection state after the transmission controller passing a detection, control the transmission buffer detection state to jump to a transmission buffer reading state corresponding to the certain reading token information after the transmission buffer passing a detection, and control the transmission buffer corresponding to the transmission buffer reading state to read data.

12. The apparatus according to claim 11, wherein the exit scheduler is further configured to: update, when read data of a current transmission controller reaches a second preset length value, a current transmission buffer to the transmission controller detection state; and update current reading token information to another reading token information.

13. The apparatus according to claim 12, wherein the exit scheduler is specifically configured to: determine, according to waiting time for reading of each transmission buffer, a transmission buffer with longest waiting time for reading; and update the current reading token information to the reading token information of the transmission buffer with the longest waiting time for reading.

14. The apparatus according to claim 1, wherein the transmission controller comprises a multiple data buffer area, a transmission processor and a serial communication engine;

the transmission processor is respectively connected with the multiple data buffer area and the serial communication engine;

the multiple data buffer area is configured to cache data;

the transmission processor is configured to send data in the multiple data buffer area to the serial communication engine;

the serial communication engine is configured to receive data sent by the transmission processor and send the data to the back-end processor.

15. The apparatus according to claim 1, wherein the back-end processor comprises a multi-core central processing unit (CPU);

the multi-core CPU is configured to transmit, in a parallel manner, data to a back-end memory.

16. A method for data transmission, comprising:

receiving, by a direct memory access (DMA) controller, a request for data transmission sent by a back-end processor; and sending, according to the request for data transmission, a data reading instruction to a memory controller;

controlling, by the memory controller, according to the data reading instruction, a memory to read data, and sending the read data to the DMA controller;

receiving, by the DMA controller, the read data and sending the read data to a transmission buffer;

controlling, by a transmission scheduler, a plurality of transmission buffers to write data sent by the DMA controller, and controlling the plurality of the transmission buffers to read data and transmitting, through a transmission controller, the data to the back-end processor.

17. The method according to claim 16, wherein the receiving, by the DMA controller, the read data and sending the read data to the transmission buffer specifically comprises:

controlling, by the DMA controller, the data to be transmitted in a single frame manner or a multiple frame manner.

18. The method according to claim 17, wherein the DMA controller comprises a mapping unit, a segment counter and an intra-segment addresser;

wherein the receiving, by the DMA controller, the request for data transmission sent by the back-end processor specifically comprises:

receiving, by the mapping unit, a request for single frame data transmission sent by the back-end processor, wherein the request for single frame data transmission comprises frame start address and frame length information;

accordingly, the controlling, by the DMA controller, the data to be transmitted in the single frame manner specifically comprises:

mapping, by the mapping unit, the frame start address and the frame length information into intra-segment addressing information and segment counting information;

updating, by the intra-segment addresser, according to data sent by the DMA controller, the intra-segment addressing information; sending, when the intra-segment addressing in the intra-segment addressing information reaches a maximum value, segment count updating information to the segment counter; and setting the intra-segment addressing in the intra-segment addressing information as an initial value of the intra-segment addressing to perform the intra-segment addressing of a next segment;

performing, by the segment counter, when the segment count updating information is received, subtraction counting until a count in the segment counting information is zero;

wherein the setting, by the intra-segment addresser, the intra-segment addressing in the intra-segment addressing information as the initial value of the intra-segment addressing to perform the intra-segment addressing of the next segment specifically comprises:

setting, by the intra-segment addresser, the intra-segment addressing in the intra-segment addressing information as zero to perform the intra-segment addressing of the next segment;

the performing, by the segment counter, when the segment count updating information is received, subtraction counting until the count in the segment counting information is the initial value of the segment counting specifically comprises:

performing, by the segment counter, when the segment count updating information is received, counting by subtracting one until the count in the segment counting information is zero.

19. The method according to claim 17, wherein the DMA controller comprises a mapping unit, an intra-segment addresser, a segment counter and a frame counter;

wherein the receiving, by the DMA controller, a request for data transmission sent by the back-end processor specifically comprises:

receiving, by the mapping unit, a request for multiple frame data transmission sent by the back-end processor, wherein the request for multiple frame data transmission comprises a number of frames, frame start address and frame length information;

the controlling, by the DMA controller, the data to be transmitted in the multiple frame manner specifically comprises:

mapping, by the mapping unit, the number of frames, the frame start address and the frame length information into intra-segment addressing information, segment counting information and frame counting information;

updating, by the intra-segment addresser, according to data sent by the DMA controller, the intra-segment addressing information; sending, when the intra-segment addressing in the intra-segment addressing information reaches a maximum value, segment count updating information to the segment counter; and setting the intra-segment addressing in the intra-segment addressing information as an initial value of the intra-segment addressing to perform the intra-segment addressing of a next segment;

performing, by the segment counter, when the segment count updating information is received, subtraction counting, sending, when a count in the segment counting information is zero, frame count updating information to the frame counter, and setting the count in the segment counting information as a maximum value to perform the segment counting of a next frame;

performing, by the frame counter, when the frame count updating information is received, subtraction counting until a count in the frame counting information is zero;

wherein the setting, by the intra-segment addresser, the intra-segment addressing in the intra-segment addressing information as the initial value of the intra-segment addressing to perform the intra-segment addressing of the next segment specifically comprises:

setting, by the intra-segment addresser, the intra-segment addressing in the intra-segment addressing information as zero to perform the intra-segment addressing of the next segment;

the performing, by the segment counter, when the segment count updating information is received, subtraction counting, sending, when the count in the segment counting information is the initial value of the segment counting, frame count updating information to the frame counter specifically comprises:

performing, by the segment counter, when the segment count updating information is received, counting by subtracting one, and sending, when the count in the segment counting information is zero, frame count updating information to the frame counter;

the performing, by the frame counter, when the frame count updating information is received, subtraction counting until the count in the frame counting information is the initial value of the frame counting specifically comprises:

performing, by the frame counter, when the frame count updating information is received, counting by subtracting one until the count in the frame counting information is zero.

20. The method according to claim 16, wherein the transmission scheduler comprises an entry scheduler and an exit scheduler;

wherein the controlling, by the transmission scheduler, the plurality of the transmission buffers to write data sent by the DMA controller, and controlling the plurality of the transmission buffers to read data specifically comprises:

controlling, by the entry scheduler, according to an entry scheduling state and writing token information, the transmission buffer with writing authority to write data;

controlling, by the exit scheduler, according to an exit scheduling state and reading token information, the transmission buffer with reading authority to read data.

21. The method according to claim 20, wherein the entry scheduling state comprises an idle state and a plurality of transmission buffer writing states;

the controlling, by the entry scheduler, according to the entry scheduling state and the writing token information, the transmission buffer with the writing authority to write the data specifically comprises:

controlling, by the entry scheduler, when the entry scheduling state is the idle state and the writing token information is certain writing token information, the idle state to jump to a transmission buffer writing state corresponding to the certain writing token information; and controlling a transmission buffer corresponding to the transmission buffer writing state to write data;

wherein after the controlling the transmission buffer to write data, the method further comprises:

updating, when written data of a current transmission buffer reaches a first preset length value, a current transmission buffer writing state to the idle state; and updating current writing token information to another writing token information;

wherein the updating the current writing token information to another writing token information specifically comprises:

determining, by the entry scheduler, according to waiting time for writing of each transmission buffer, the transmission buffer with longest waiting time for writing; and updating the current writing token information to the writing token information of the transmission buffer with the longest waiting time for writing.

22. The method according to claim 20, wherein the exit scheduling state comprises a transmission controller detection state, a transmission buffer detection state, and a plurality of transmission buffer reading states;

wherein the controlling, by the exit scheduler, according to the exit scheduling state and the reading token information, the transmission buffer with the reading authority to read the data specifically comprises:

when the exit scheduling state is the transmission controller detection state and the reading token information is certain reading token information, controlling the transmission controller detection state to jump to the transmission buffer detection state after the transmission controller passing a detection, controlling the transmission buffer detection state to jump to a transmission buffer reading state corresponding to the certain reading token information after the transmission buffer passing a detection, and controlling a transmission buffer corresponding to the transmission buffer reading state to read data;

wherein after the controlling the transmission buffer to read data, the method further comprises:

updating, when read data of a current transmission controller reaches a second preset length value, a current transmission buffer reading state to the transmission controller detection state; and updating current reading token information to another reading token information;

wherein the updating the current reading token information to another reading token information specifically comprises:

determining, by the exit scheduler, according to waiting time for reading of each transmission buffer, a transmission buffer with longest waiting time for reading, and updating the current reading token information to the reading token information of the transmission buffer with the longest waiting time for reading.

23. The method according to claim 16, wherein the transmission controller comprises a multiple data buffer area, a transmission processor and a serial communication engine;

the method further comprises:

caching, by the multiple data buffer area, data;

sending, by the transmission processor, data in the multiple data buffer area to the serial communication engine;

receiving, by the serial communication engine, data sent by the transmission processor and sending the data to the back-end processor.

24. A non-transitory computer readable storage medium stored with a computer program, and the computer program is executed by a processor to implement the method for data transmission, wherein the method comprises:

receiving, by a direct memory access (DMA) controller, a request for data transmission sent by a back-end processor; and sending, according to the request for data transmission, a data reading instruction to a memory controller;

controlling, by the memory controller, according to the data reading instruction, a memory to read data, and sending the read data to the DMA controller;

receiving, by the DMA controller, the read data and sending the read data to a transmission buffer;

controlling, by a transmission scheduler, a plurality of transmission buffers to write data sent by the DMA controller, and controlling the plurality of the transmission buffers to read data and transmitting, through a transmission controller, the data to the back-end processor.

* * * * *